United States Patent
Medved'

(10) Patent No.: US 12,415,441 B2
(45) Date of Patent: Sep. 16, 2025

(54) FASTENING ARRANGEMENT AND SEAT

(71) Applicant: Adient US LLC, Plymouth, MI (US)

(72) Inventor: Andrej Medved', Trenčín (SK)

(73) Assignee: Adient US LLC, Plymouth, MI (US)

( * ) Notice: Subject to any disclaimer, the term of this patent is extended or adjusted under 35 U.S.C. 154(b) by 273 days.

(21) Appl. No.: 17/810,847

(22) Filed: Jul. 6, 2022

(65) Prior Publication Data

US 2023/0008632 A1 Jan. 12, 2023

(30) Foreign Application Priority Data

Jul. 7, 2021 (DE) .................. 10 2021 207 175.9
Dec. 10, 2021 (DE) .................. 10 2021 214 160.9

(51) Int. Cl.
*B60N 2/015* (2006.01)
*B60N 2/90* (2018.01)

(52) U.S. Cl.
CPC ..... *B60N 2/01583* (2013.01); *B60N 2/01516* (2013.01); *B60N 2/919* (2018.02)

(58) Field of Classification Search
CPC .... B60N 2/01583; B60N 2/0881; B60N 2/08; B60N 2/0887; B60N 2/0893; B60N 2/0818; B60N 2/919; B60N 2/3097; B60N 2/30; B60N 2/0155; B60N 2/01508; B60N 2/01516; B60N 2002/952
USPC ..... 296/63, 65.03, 65.15, 65.18; 297/440.14, 297/331, 335, 336, 440.22
See application file for complete search history.

(56) References Cited

U.S. PATENT DOCUMENTS

| | | | | |
|---|---|---|---|---|
| 5,443,239 A * | 8/1995 | Laporte | ................... | B60N 2/26 297/440.2 |
| 5,765,840 A * | 6/1998 | Tame | ................... | B60N 2/1803 248/419 |
| 8,215,695 B2 * | 7/2012 | Ida | ..................... | B60N 2/01583 297/316 |
| 9,821,683 B2 * | 11/2017 | Mizuno | ................ | B60N 2/3045 |
| 10,065,532 B2 * | 9/2018 | Ioppolo | ................ | B60N 2/0893 |
| 2003/0122407 A1 * | 7/2003 | Boyd | ....................... | B60N 2/80 297/440.22 |
| 2020/0009995 A1 * | 1/2020 | Sonar | ...................... | B60R 16/03 |
| 2024/0190317 A1 * | 6/2024 | Heeg | ................ | H01R 13/62938 |

FOREIGN PATENT DOCUMENTS

DE 202006005525 U1 7/2006

OTHER PUBLICATIONS

German Patent Office, Office Action in Appliction No. DE10 2021 214 160.9, dated Jun. 14, 2022, 6 pages. Munich, Germany.

* cited by examiner

*Primary Examiner* — Amy R Weisberg
*Assistant Examiner* — Wenwei Zhuo
(74) *Attorney, Agent, or Firm* — Marshall & Melhorn, LLC

(57) ABSTRACT

A fastening arrangement of a seat on a rail arrangement may have a modular construction and may have one lock module for releasably arresting the fastening arrangement on the rail arrangement. The fastening arrangement may also have one lock unlocking module for unlocking the lock module. The fastening arrangement may also have one rail unlocking module.

9 Claims, 35 Drawing Sheets

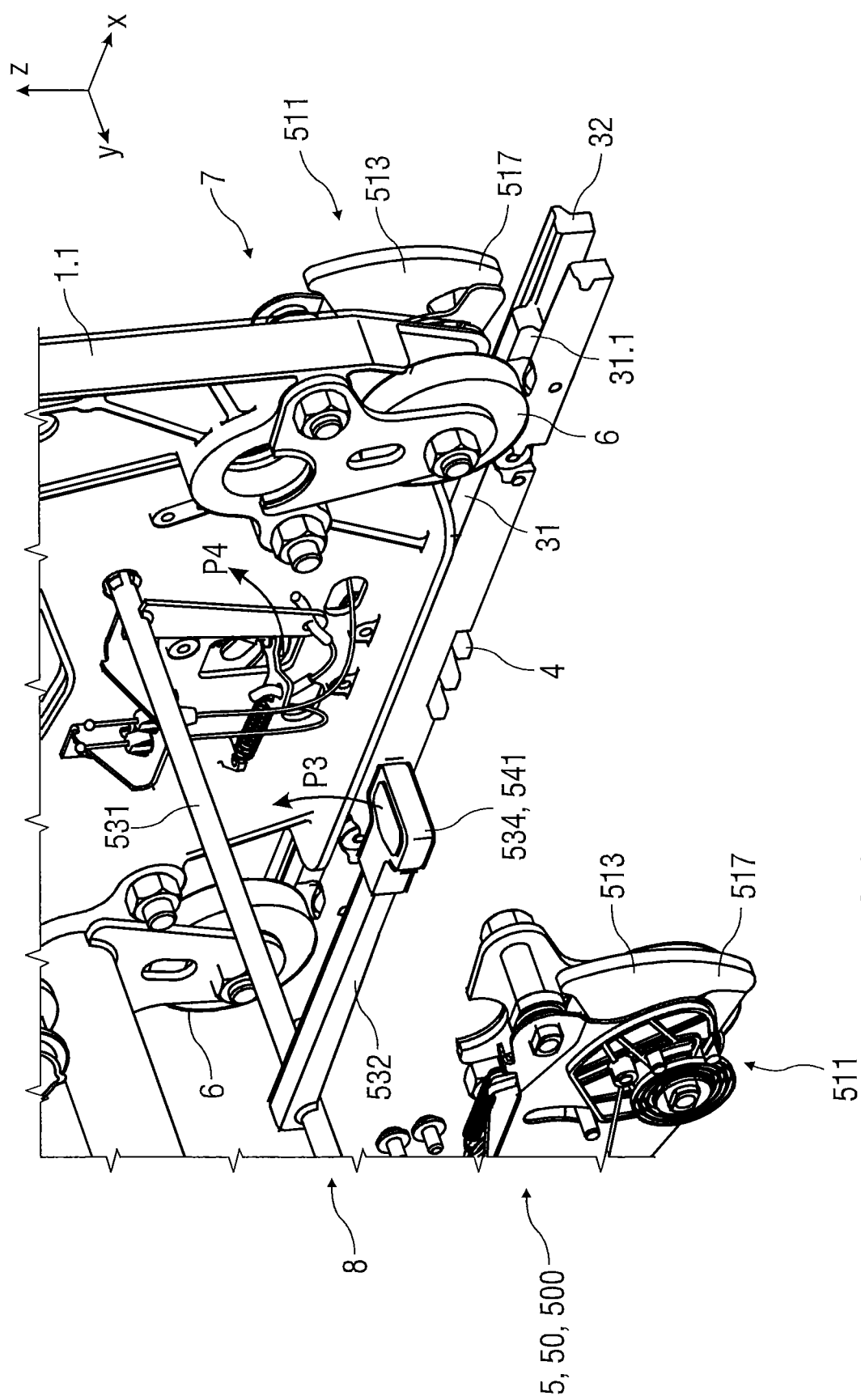

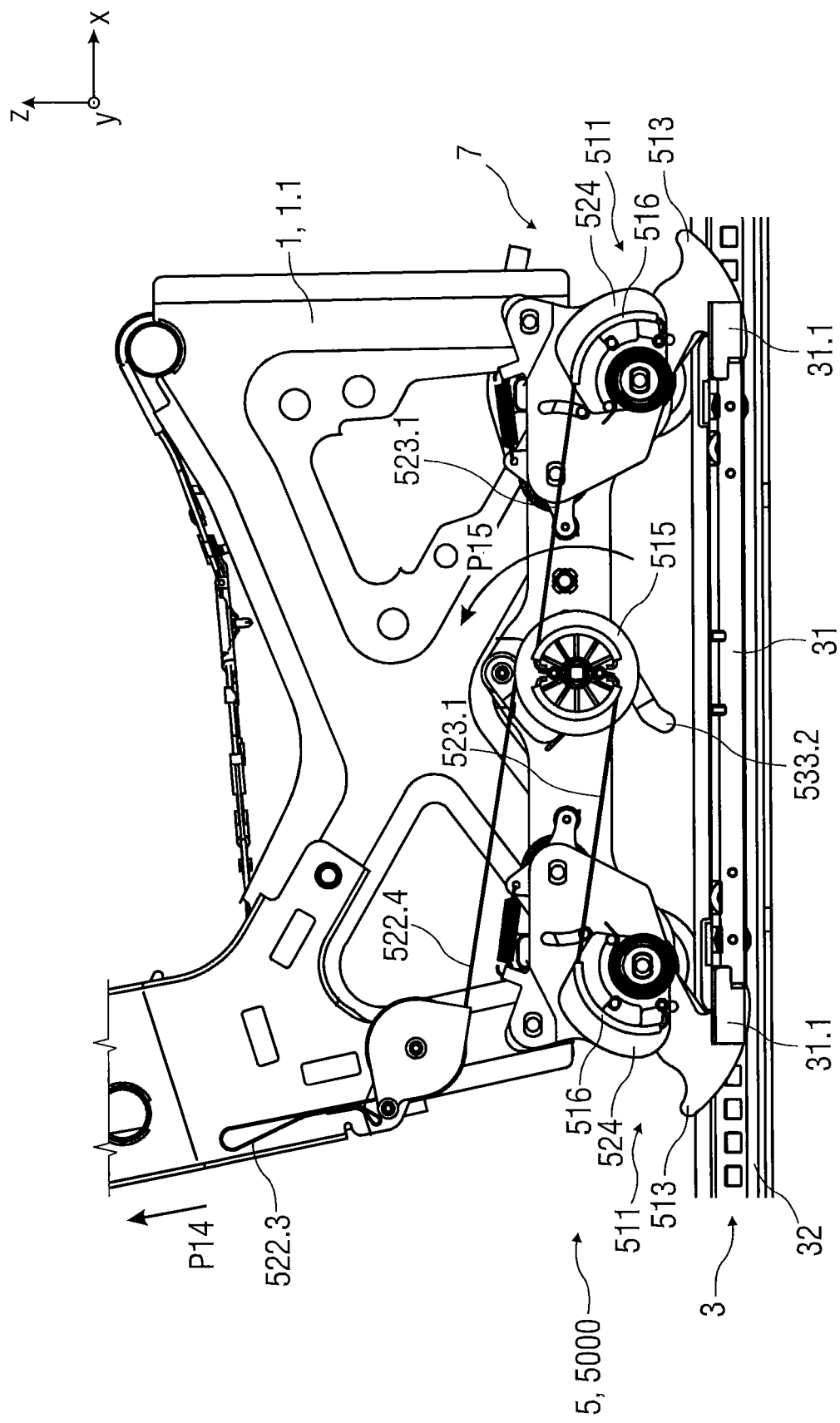

FASTENING ARRANGEMENT AND SEAT

FIELD

The invention relates to a fastening arrangement of a seat on a rail arrangement and to a seat with such a fastening arrangement.

BACKGROUND

Fastening arrangements for a seat are known in the prior art. For example, the seat can be fastened on a rail arrangement releasably by hooks or screws or nonreleasably by a welded connection.

SUMMARY

It is the object of the present invention to specify a simple fastening arrangement of a seat on a rail arrangement and a seat with such a simple fastening arrangement.

The object is achieved according to the invention by a fastening arrangement of a seat on a rail arrangement, wherein the fastening arrangement is of modular construction and comprises at least one lock module for releasably arresting the fastening arrangement on the rail arrangement, one lock unlocking module and one rail unlocking module.

Using such a modular seat fastening arrangement, a seat can be simply and rapidly mounted on and removed from a seat longitudinal adjustment device. The individual modules, such as the lock module, the lock unlocking module and the rail unlocking module, can be preassemblable here. Such a modular fastening arrangement has few parts and can be mounted particularly simply and rapidly and also has a low weight.

Furthermore, the lock unlocking module and the rail unlocking module are operable in a simple manner independently of one another or synchronously, i.e. can be brought from an arresting position of a seat lock and/or a rail locking means into a released position of the seat lock or of the rail locking means, or vice versa.

The lock module can be of multi-part design and comprises, for example, two or four lock units, e.g. one pair of lock units or two pairs of lock units. In one possible embodiment, the lock units are synchronously operable, in particular unlockable, by the lock unlocking module.

The lock units are preferably arranged on a common carrier. In particular, the lock units can be preassembled on the common carrier.

Furthermore, the fastening arrangement can comprise an actuating module for actuating the lock unlocking module and/or the rail unlocking module. The actuating module can comprise one or more actuating units for dependently or independently actuating the lock unlocking module and/or the rail unlocking module. The actuating units can be formed separately. However, the actuating units can also be coupled in terms of movement. The actuating units can be designed as a lever arrangement, in particular as a lever arm arrangement, and/or as a tension arrangement, in particular tension strap arrangement or tension belt arrangement.

In one possible embodiment, the actuating module is coupled to the lock module via the lock unlocking module.

Alternatively or additionally, the actuating module can be coupled to a locking element for the rail arrangement via the lock unlocking module.

With regard to the seat according to the invention, the object is achieved by a rail arrangement and the previously described fastening arrangement, which is designed for releasably fastening the seat on the rail arrangement.

In one possible embodiment, the fastening arrangement is designed as a preassemblable docking mechanism. The docking mechanism here comprises the lock module and also the lock unlocking module and the rail unlocking module. Preferably, an unlocking element and/or an unlocking mechanism for the rail arrangement can additionally be part of the preassemblable docking mechanism. Such a modular preassemblable docking mechanism for releasably fastening the seat on the rail arrangement permits simple and rapid installation or removal of the seat on or from the rail arrangement.

In one possible embodiment, the rail arrangement comprises two pairs of rails each having an upper rail and a lower rail. The fastening arrangement is releasably arrestable at one rail end of the upper rail by a respective lock unit. Such an in particular end-face releasable arresting of the fastening arrangement on the rail ends of the upper rail is simply constructed and permits simple and reliable installation of the fastening arrangement on the rail arrangement.

DESCRIPTION OF THE FIGURES

Exemplary embodiments of the invention will be discussed in more detail with reference to drawings, in which:

FIG. 16A shows a schematic perspective view of one embodiment of blocking elements, FIG. 19A shows a schematic side view of one embodiment of a cable mechanism in a movement sequence.

DETAILED DESCRIPTION

Parts which correspond to one another are denoted by the same reference designations in all figures.

Figure 1:
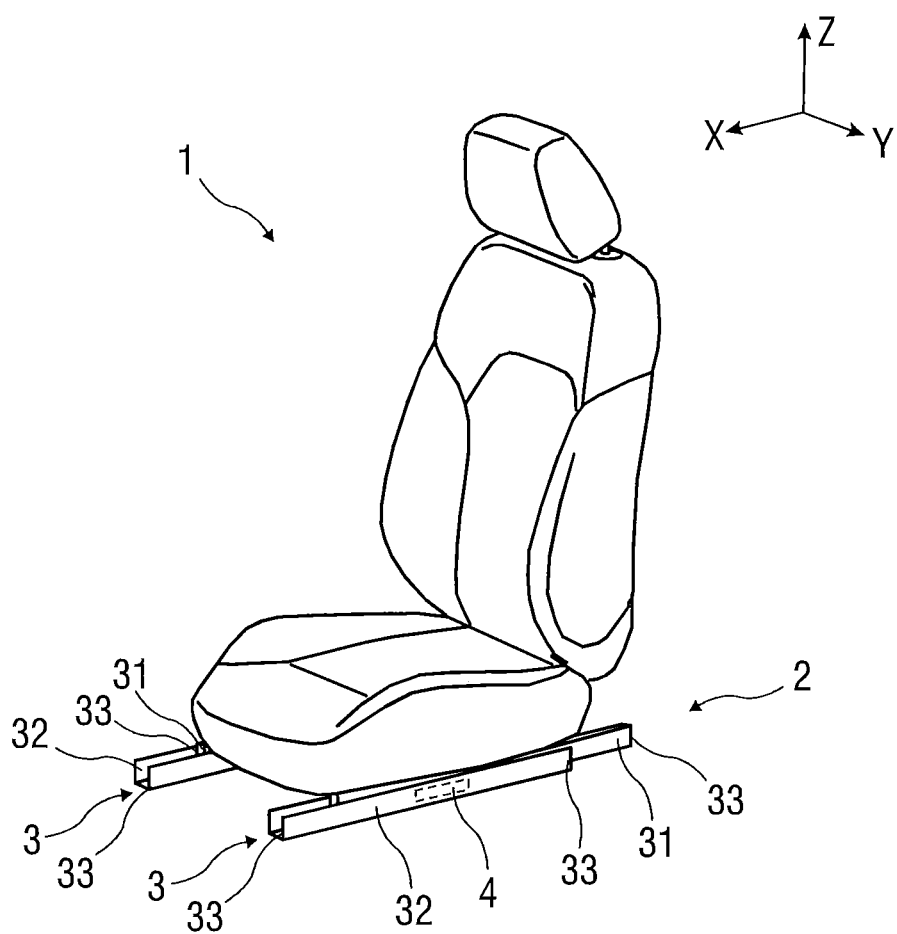
FIG. 1 shows a perspective illustration of a seat with a rail arrangement.

FIG. 1 shows schematically, in a perspective illustration, a seat 1, in particular vehicle seat, with a seat longitudinal adjustment device. The seat 1 is arranged, for example, on a vehicle body, not illustrated specifically, by the seat longitudinal adjustment device.

A vehicle seat 1 which is schematically illustrated in FIG. 1 is described below using three spatial directions which run perpendicularly to one another. In the case of a seat 1 installed in the vehicle, a longitudinal direction X runs largely horizontally and preferably parallel to a vehicle longitudinal direction which corresponds to the normal direction of travel of the vehicle. A transverse direction Y which runs perpendicularly to the longitudinal direction X is likewise oriented horizontally in the vehicle and runs parallel to a vehicle transverse direction. A vertical direction Z runs perpendicularly to the longitudinal direction X and perpendicularly to the transverse direction Y. In the case of a vehicle seat 1 which is installed in the vehicle, the vertical direction Z runs preferably parallel to a vehicle vertical axis.

The positional and directional indications used, such as for example front, rear, top and bottom, relate to a viewing direction of an occupant seated in the seat 1 in a normal seating position, wherein the seat 1 is installed in the vehicle, in a use position suitable for passenger transport, with an upright backrest, and is oriented in the conventional manner in the direction of travel. The seat 1 may also be installed or moved, however, in a differing orientation, for example transversely with respect to the direction of travel.

The seat longitudinal adjustment device is designed as a rail arrangement 2. The rail arrangement 2 comprises, for example, two pairs of rails 3 which are arranged at a distance from one another. The respective pair of rails 3 comprises an upper rail 31, also called rail runner or seat rail, and a lower rail 32, also called guide rail or floor rail. The upper rail 31 is arranged on the lower rail 32 so as to be longitudinally adjustable between a front end position and a rear end position. This adjustability permits a longitudinal adjustment of the position of the seat 1 in the longitudinal direction X, with the frontmost position of the seat 1 being assigned to the front end position of the upper rail 31 and the rearmost position of the seat 1 being assigned to the rear end position of the upper rail 31. The upper rail 31 and the lower rail 32 each have associated rail ends 33.

The rail arrangement 2 furthermore comprises at least one locking element 4. Each pair of rails 3 here can comprise an associated locking element 4, for example in the form of a latching plate or locking plate.

For the releasable fastening of the seat 1 on the rail arrangement 2, various embodiments of a modular fastening arrangement 5 are described below. The respective fastening arrangement 5 can be preassembled. In particular, the fastening arrangement 5 can be designed as a preassemblable docking mechanism 7. Such a modular preassemblable docking mechanism 7 permits simple and rapid installation or removal of the seat 1 on or from the rail arrangement 2.

Figure 2:
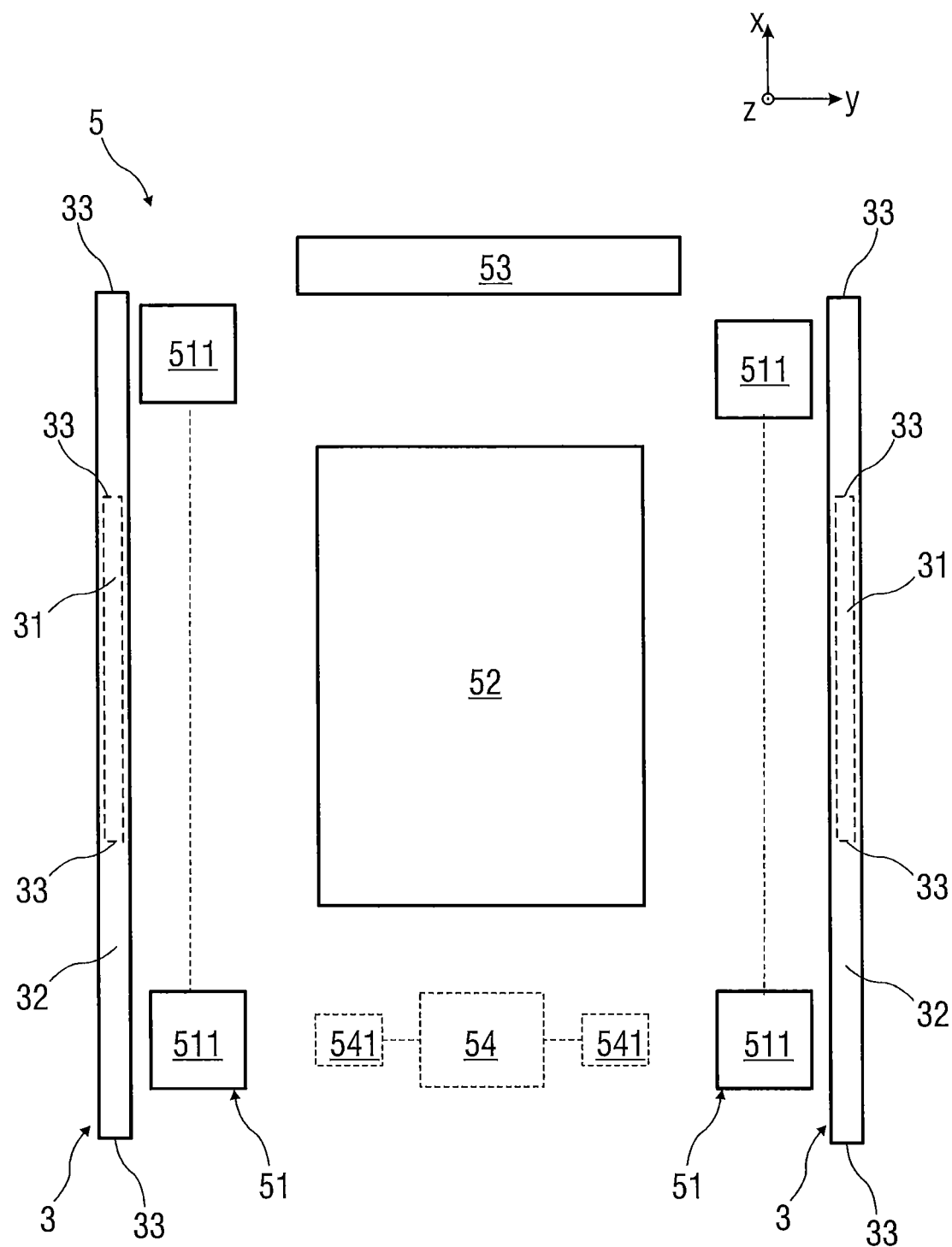
FIG. 2 shows a schematic illustration of an embodiment of a modular fastening arrangement of a seat on a rail arrangement, FIG. 3 schematically shows, in an exploded illustration, a first embodiment of a modular fastening arrangement, FIG. 4 schematically shows, in an exploded illustration, a second embodiment of a modular fastening arrangement, FIG. 5 schematically shows, in a perspective view, a second embodiment of a modular fastening arrangement, FIG. 6 schematically shows, in an exploded illustration, a third embodiment of a modular fastening arrangement, FIG. 7 schematically shows, in a perspective view, a third embodiment of a modular fastening arrangement, FIG. 8 schematically shows, in an exploded illustration, an exemplary embodiment of a lock unit, FIG. 9 schematically shows, in the assembled state, an exemplary embodiment of a lock unit.

FIG. 2 shows a schematic illustration of the modular fastening arrangement 5 of the seat 1 for fastening the seat 1 on the rail arrangement 2. The fastening arrangement 5 comprises at least one lock module 51 for releasably arresting the fastening arrangement 5 on the rail arrangement 2, one lock unlocking module 52 for unlocking the lock module 51 and one rail unlocking module 53 for unlocking the locking element 4.

Such a modular fastening arrangement 5 designed in particular as a docking mechanism 7 can be used to simply and rapidly mount and remove the seat 1 on and from the seat longitudinal adjustment device, in particular on and from the rail arrangement 2. The individual modules, such as the lock module 51, the lock unlocking module 52 and the rail unlocking module 53, can be preassemblable here. The lock module 51 in turn can comprise a plurality of separate lock units 511. The separate lock units 511 can be coupled in terms of movement; in particular, they can be actuable independently of one another and/or dependently on one another.

Such a modular fastening arrangement 5 has few preassembled installation parts and is mountable particularly simply and rapidly. Furthermore, the lock unlocking module 52 and the rail unlocking module 53 are operable in a simple manner independently of one another or synchronously, in particular can be brought from an arresting position of a seat lock, in particular the lock units 511 of the lock module 51, and/or of a rail locking means, in particular the locking element 4, into a released position of the seat lock or of the rail locking means, or vice versa.

The lock module 51 can be of multi-part design and comprises, for example, four lock units 511, e.g. two pairs of lock units 511. In one possible embodiment, the lock units 511 are operable or actuable synchronously or independently of one another using the lock unlocking module 52.

Furthermore, the various fastening arrangements 5 can comprise an actuating module 54 for actuating the associated lock unlocking module 52 and the rail unlocking module 53. The actuating module 54 can comprise one or more actuating units 541 for independently or dependently actuating the lock unlocking module 52 and/or the rail unlocking module 53. The actuating units 541 can be formed separately or can be an integral part of the lock unlocking module 52 and/or of the rail unlocking module 53. However, the actuating units 541 can also be coupled in terms of movement. The actuating units 541 can be designed as a lever arrangement, in particular as a lever arm arrangement, and/or as a tension arrangement, in particular tension strap arrangement or tension belt arrangement.

Figure 3:
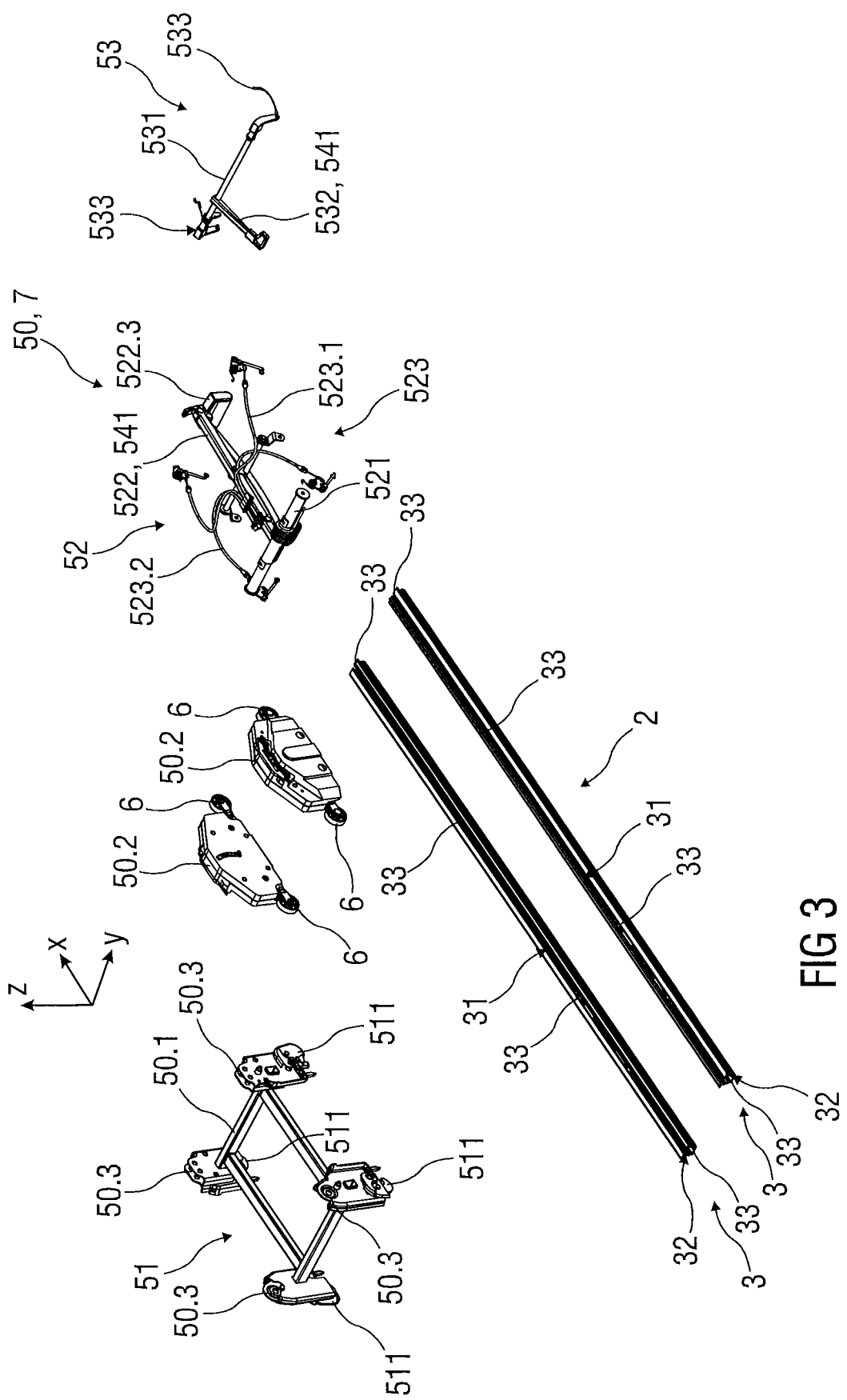

FIG. 3 schematically shows, in an exploded illustration, a first embodiment of a first modular fastening arrangement 50.

The first modular fastening arrangement 50 comprises, as lock module 51, a frame 50.1, on which four lock units 511 are arranged and held. The frame 50.1 is, for example, a rectangular carrier or an H-shaped carrier bearing a respective lock unit 511 at its corners or at its free ends. Furthermore, the frame 50.1 serves for fastening the seat 1. For this purpose, four fastening elements 50.3 are provided on the frame 50.1 and can be used to connect the seat 1 fixedly to the fastening arrangement 50.

The lock unlocking module 52 comprises at least one first carrier 521, a lock actuating unit 522, which is designed as an integral actuating unit 541, and a lock unlocking mechanism 523. The first carrier 521 of the lock unlocking module 52 is designed as a longitudinal rod or longitudinal tube. The lock actuating unit 522 is designed as a lever arm. The lock actuating unit 522 comprises a gripping element 522.3. The lock unlocking mechanism 523 is designed, for example, as a pull mechanism, in particular a cable pull mechanism, which is coupled, in particular coupled in terms of movement, to the lock units 511 in the assembled state. The lock unlocking mechanism 523 has, for example, two cable pulls 523.1 and 523.2 which are both designed as double cable pulls.

The rail unlocking module 53 comprises at least one second carrier 531, a rail actuating unit 532, which is designed as an integral actuating unit 541, and a rail unlocking mechanism 533. The rail actuating unit 532 is designed as a lever arm. The rail unlocking mechanism 533 is designed as a pull mechanism or lever mechanism, in particular a cable pull mechanism or lever arm mechanism, which, in the assembled state, is coupled, in particular coupled in terms of movement, to the locking element 4 for unlocking the rail or locking the rail.

Depending on the design of the rail locking means, one locking element 4 can be provided per pair of rails 3. Alternatively, just one locking element 4 in one of the pairs of rails 3 can also be provided per rail arrangement 2.

Furthermore, for coupling the lock unlocking module 52 to the lock units 511, the first fastening arrangement 50 can comprise one or two lock adapters 50.2 which can be arranged on the frame 50.1.

Furthermore, the respective lock adapter 50.2 can comprise guide elements or sliding elements, in particular rolling elements 6. In the assembled state of the modular fastening arrangement 5 or 50 and in the fastening arrangements 500 and 5000 described below, the guide elements or sliding elements serve for guiding the seat 1 on or in the rail arrangement 2, in particular on guide surfaces or rolling surfaces of the lower rails 32 of the pairs of rails 3. The seat 1 is arranged movably in a sliding manner on the lower rail 31 in the unlocked state of the rail unlocking module 53 using the rolling elements 6 via the respective fastening arrangement 5, 50, 500, or 5000, which is mounted and arrested on the upper rails 31 by the lock module 51.

Figure 11:
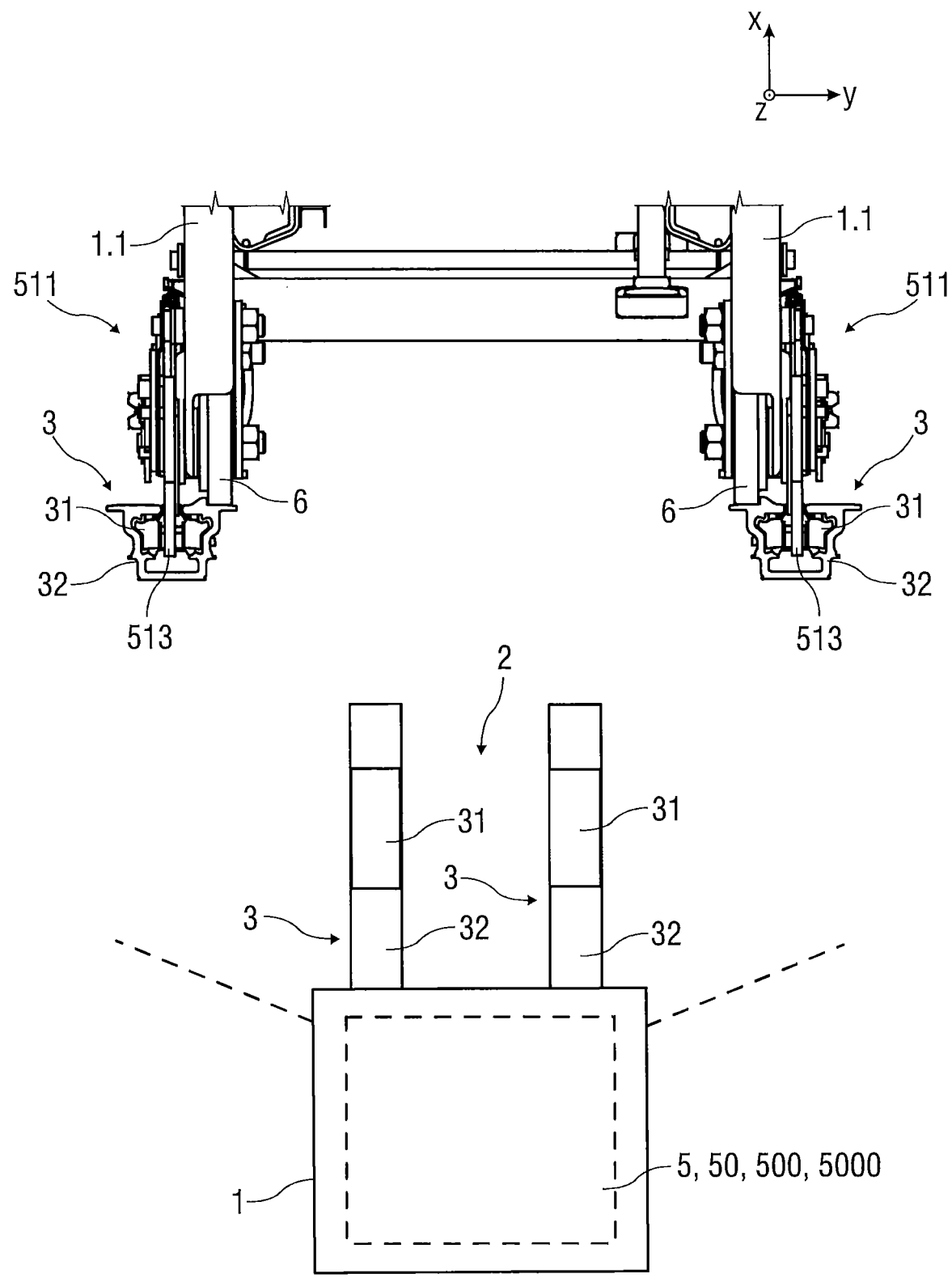
FIG. 11 shows a schematic illustration of the releasable seat pre-positioned on the rail arrangement.

In the exemplary embodiment which is shown, the rolling elements 6 are arranged in a sliding manner on sliding surfaces or guide surfaces of the lower rails 32 (also see in the detail in FIG. 11). Alternatively, the rolling elements 6 can also be arranged in a sliding manner within the pairs of rails 3, in a cavity formed between upper rail 31 and lower rail 32.

Figure 4:
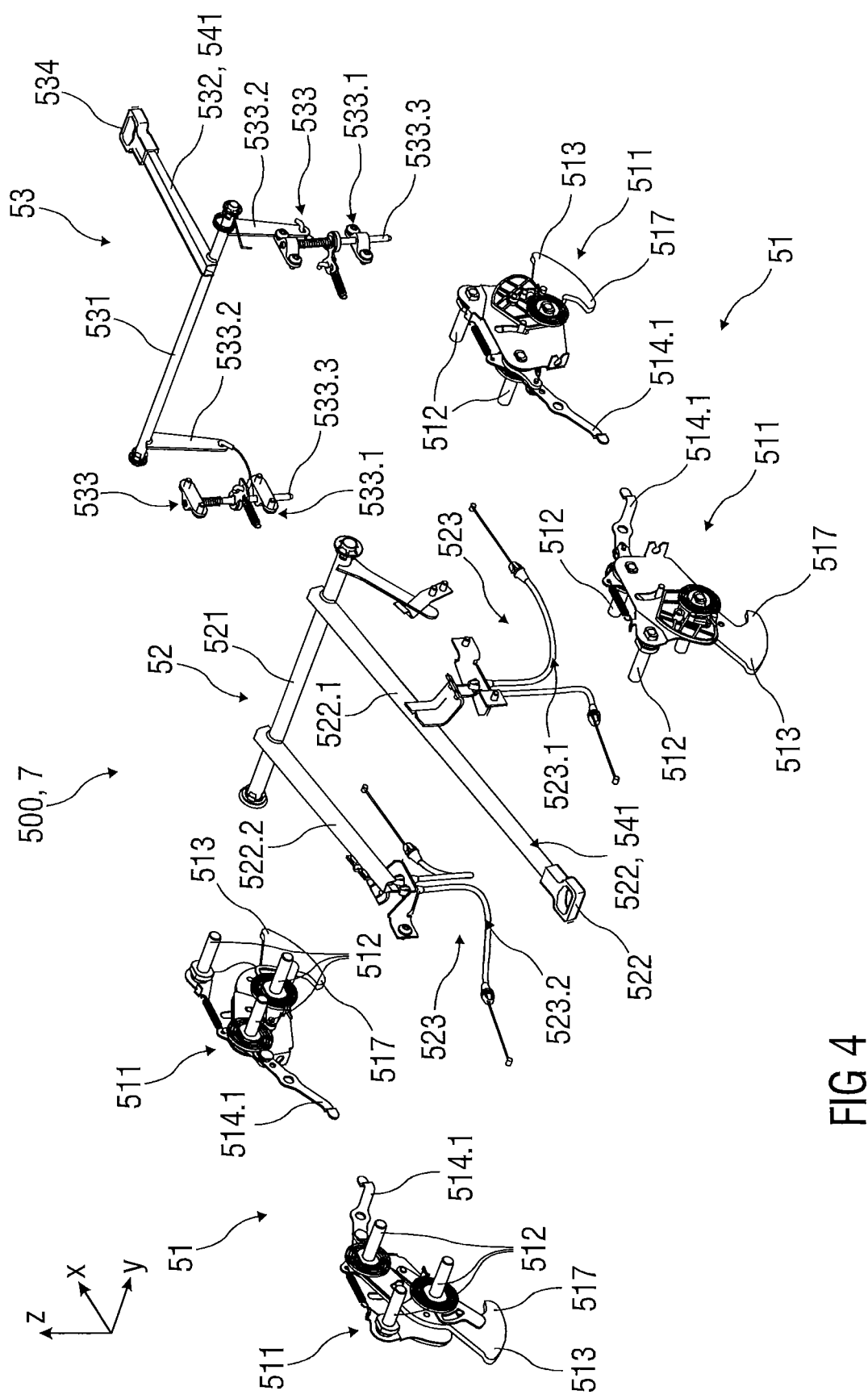
Figure 5:
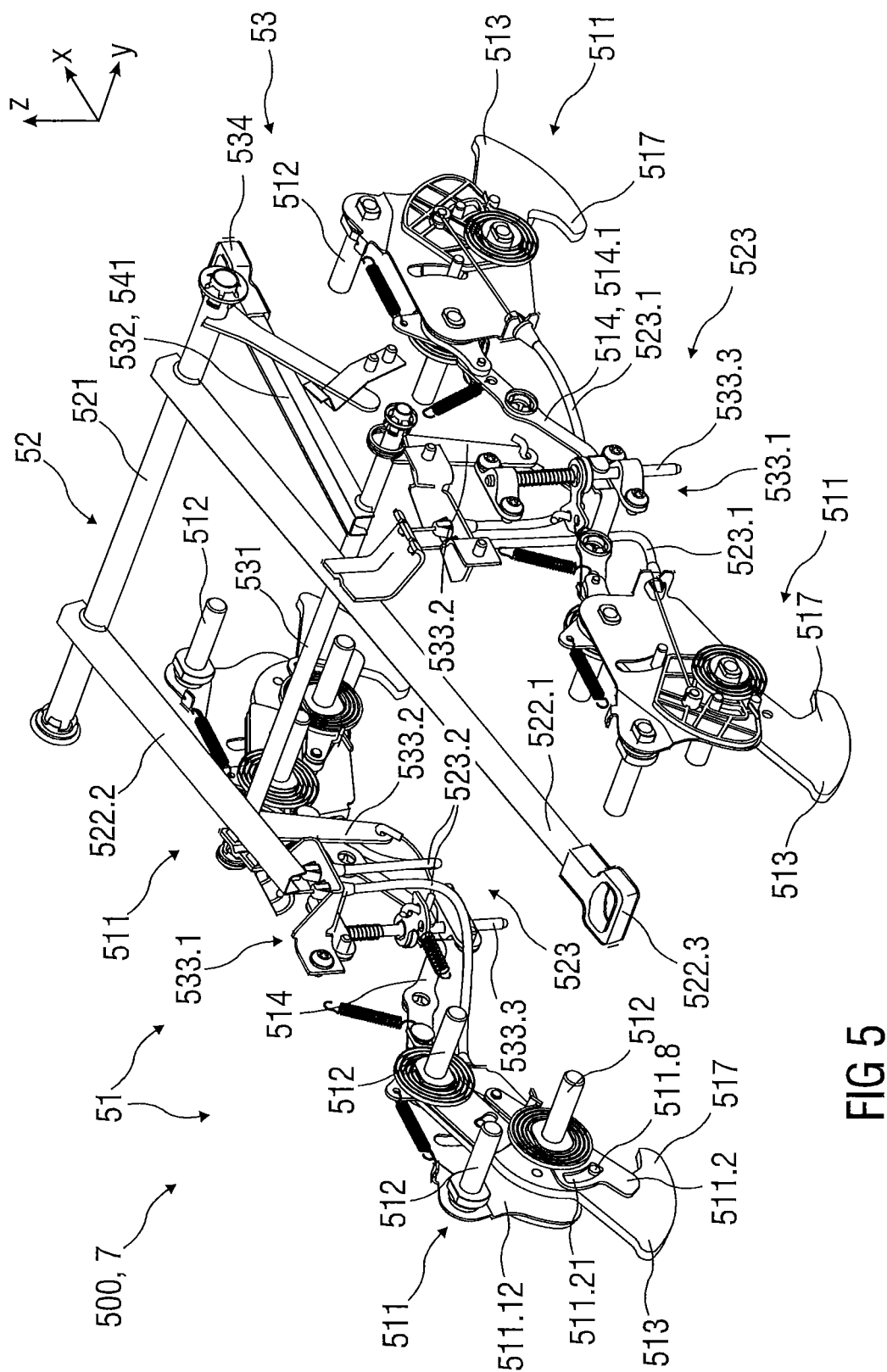

FIGS. 4 and 5 schematically show, in an exploded illustration and in a perspective view, a second embodiment of a modular fastening arrangement 500 (called second fastening arrangement 500 below).

Said second fastening arrangement 500 can be preassembled. The second fastening arrangement 500 can be designed as a preassembled docking mechanism 7.

The carrier or frame 50.1 and the lock adapter 50.2 are omitted in this embodiment. Said second fastening arrangement 500 therefore comprises fewer parts and modules. In these FIGS. 4 and 5, the rail arrangement 2 is not illustrated for the sake of clarity.

The second modular fastening arrangement 500 comprises, as lock module 51, four lock units 511 with integrated carrier elements 512. The respective lock unit 511 comprises a carrier plate 511.12. The integrated carrier elements 512 serve for fastening the seat 1 in a manner not illustrated specifically. The carrier elements 512 are designed, for example, as fastening bolts or fastening pins which are connected to the seat 1 and to the carrier plate 511.12 in the assembled state.

In the assembled state with the rail arrangement 2, the second fastening arrangement 500 is fixed in a form-fitting and/or force-fitting manner at the rail ends 33 of the upper rails 31 by a respective lock unit 511.

The four lock units 511 each comprise a blocking element 513 for releasable locking in the rail arrangement 2. The respective blocking element 513 is designed, for example, as a blocking hook. The blocking hooks are used to releasably fix and fasten the second fastening arrangement 500 on the rail arrangement 2.

Furthermore, each lock unit 511 comprises an unlocking unit 514 for coupling the lock unit 511 to the actuating module 54, in particular to one of the actuating units 541. The unlocking unit 514 is designed as a joint mechanism and/or lever mechanism.

The respective unlocking unit 514 can be used to unlock the associated lock unit 511, in particular to unlock all the lock units 511 synchronously, such that the lock module 51 can be opened and the second fastening arrangement 500 extracted or removed from the seat 1.

The unlocking unit 514 is coupled in terms of movement to the rail unlocking module 53 such that, when the rail unlocking module 53 is actuated in order to unlock the locking element 4 of the rail arrangement 2, the unlocking units 514 are actuated synchronously in order to unlock the lock units 511 of the lock module 51. As a result, by actuation of the rail unlocking module 51, for example by an associated rail actuating unit 532, the locking elements 4 of the rail arrangement 2 and the lock units 511 of the lock module 51 can be unlocked synchronously, and therefore the fastening arrangement 500, and thus optionally the seat 1, is released from the rail arrangement 2 and can be extracted.

Two lock units 511, in particular a front lock unit 511 and a rear lock unit 511, as seen in the longitudinal direction X of the rail arrangement 2, are provided per pair of rails 3. The blocking elements 513 are mounted pivotably on the lock units 511. The blocking elements 513 are designed as blocking hooks 517.

The two blocking elements 513 associated with a pair of rails 3 are mounted on the associated lock units 511 in such a manner that the blocking hooks 517 thereof are directed towards one another. In particular, when the unlocking unit 514 is actuated in order to unlock and open the lock units 511, the two blocking elements 513 of the respective pair of rails 3 are pivoted away from one another. The blocking hooks 517 thereby pivot out of their arresting engagement at the rail ends 33. The lock module 51 is therefore opened and the second fastening arrangement 500 can be released and extracted from the form-fitting and/or force-fitting connection to the rail arrangement 2.

The lock unlocking module 52 comprises at least one first carrier 521, a lock actuating unit 522, which is designed as an integral actuating unit 541, and a lock unlocking mechanism 523. The first carrier 521 of the lock unlocking module 52 is designed as a transverse rod or a transverse tube.

The lock actuating unit 522 is designed as a lever arm mechanism. The lever arm mechanism comprises two lever arms 522.1 and 522.2, wherein one of the lever arms 522.1 is provided with a gripping element 522.3. The two lever arms 522.1 and 522.2 are arranged on the carrier 521 for rotation therewith and are coupled in terms of movement via the first carrier 521 such that, when the lever arm 522.1 is actuated, the gripless lever arm 522.2 is entrained by the gripping element 522.3 as a result of the rotation of the first carrier 521. The lever arms 522.1 and 522.2 are arranged perpendicularly to the first carrier 521.

The lock unlocking mechanism 523 is designed as a pull mechanism, in particular a cable pull mechanism, which is coupled, in particular coupled in terms of movement, to the lock units 511 in the assembled state. The pull mechanism has two cable pulls 523.1 and 523.2 which are both designed as double cable pulls. The two cable pulls 523.1 and 523.2 are respectively coupled at one end to one of the lever arms 522.1 and 522.2 and are coupled at the other end to two associated lock units 511. By actuation of the lever arm 522.1 and by the other lever arm 522.2 being entrained, the two cable pulls 523.1 and 523.2 are actuated, thus unlocking the associated lock units 511, in particular the blocking elements 513. The lock unlocking mechanism 523 is designed as a separate mechanism for unlocking the lock module 51, in particular for synchronously unlocking all of the lock units 511.

The rail unlocking module 53 comprises at least one second carrier 531, a rail actuating unit 532, which is designed as an integral actuating unit 541, and a rail unlocking mechanism 533.

The rail actuating unit 532 is designed as a lever arm. The rail unlocking mechanism 533 is designed as a pull mechanism, articulated mechanism and/or bar mechanism, which, in the assembled state, is coupled, in particular coupled in terms of movement, to the locking element 4 for unlocking the rail or locking the rail, and/or to the lock units 511. In order to actuate the rail unlocking mechanism 533, the associated integral actuating unit 541 comprises a gripping unit 534.

Depending on the design of the rail locking means, one locking element 4 can be provided per pair of rails 3. Alternatively, just one locking element 4 in one of the pairs of rails 3 can also be provided per rail arrangement 2. Accordingly, the rail unlocking mechanism 533 can comprise one or two rail unlocking units 533.1.

In order to actuate the rail unlocking mechanism 533, the rail unlocking module 53 comprises one rail unlocking unit 533.1 per pair of rails 3. The respective rail unlocking unit 533.1 comprises two lever arms 531.1 which emerge perpendicularly from the carrier 531 and on each of which a free end of a rail unlocking arm 533.2 is formed which actuates the locking element 4 of the respective pair of rails 3 for unlocking or locking purposes.

During the removal or final installation and fastening of the seat 1 from or on the rail arrangement 2, in said second fastening arrangement 500 the lock unlocking module 52 and the rail unlocking module 53 are coupled to each other in terms of movement. For this purpose, two of the unlocking units 514 are each coupled in terms of movement to one of the rail unlocking units 533.1 of the rail unlocking mechanism 533.

The unlocking units 514 are designed, for example, as lever arms 514.1 or articulated arms. The rail unlocking units 533.1 are designed as vertically movable pins 533.3 or bolts. Two lever arms 514.1 of the two unlocking units 514 for unlocking the locking element 4 of one of the pairs of rails 3 are coupled to, in particular held pivotably on, the pin 533.3 of one of the rail unlocking units 533.1.

Such an arrangement permits the synchronous actuation of the rail unlocking module 53, of the lock module 51, in particular all of the lock units 511, and of the lock unlocking module 52, in particular all of the unlocking units 514, such that the fastening arrangement 500 can be removed from or mounted on the rail arrangement 2.

In order to adjust the blocking element 513 from the locking position into the unlocking position, the respective lock unit 511 comprises a control element 511.2. The control element 511.2 has a guide slot 511.21 (illustrated in FIGS. 5, 6 and 8) into which a guide pin 511.8 (illustrated in FIGS. 5 and 6), which is arranged on the blocking element 513, is guided.

The construction and the components of the respective lock unit 511 are described in more detail below with reference to FIG. 8.

Figure 6:
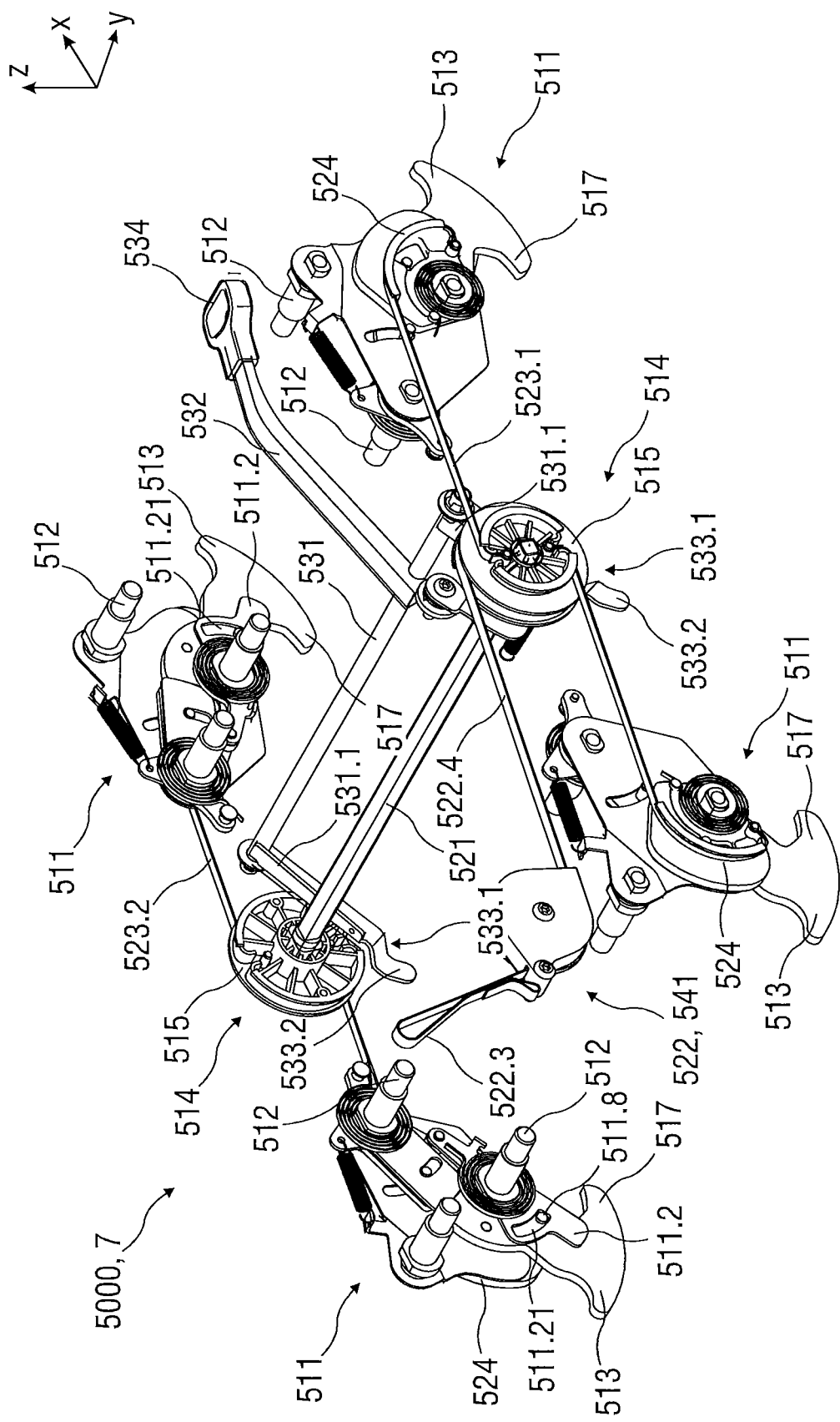
Figure 7:
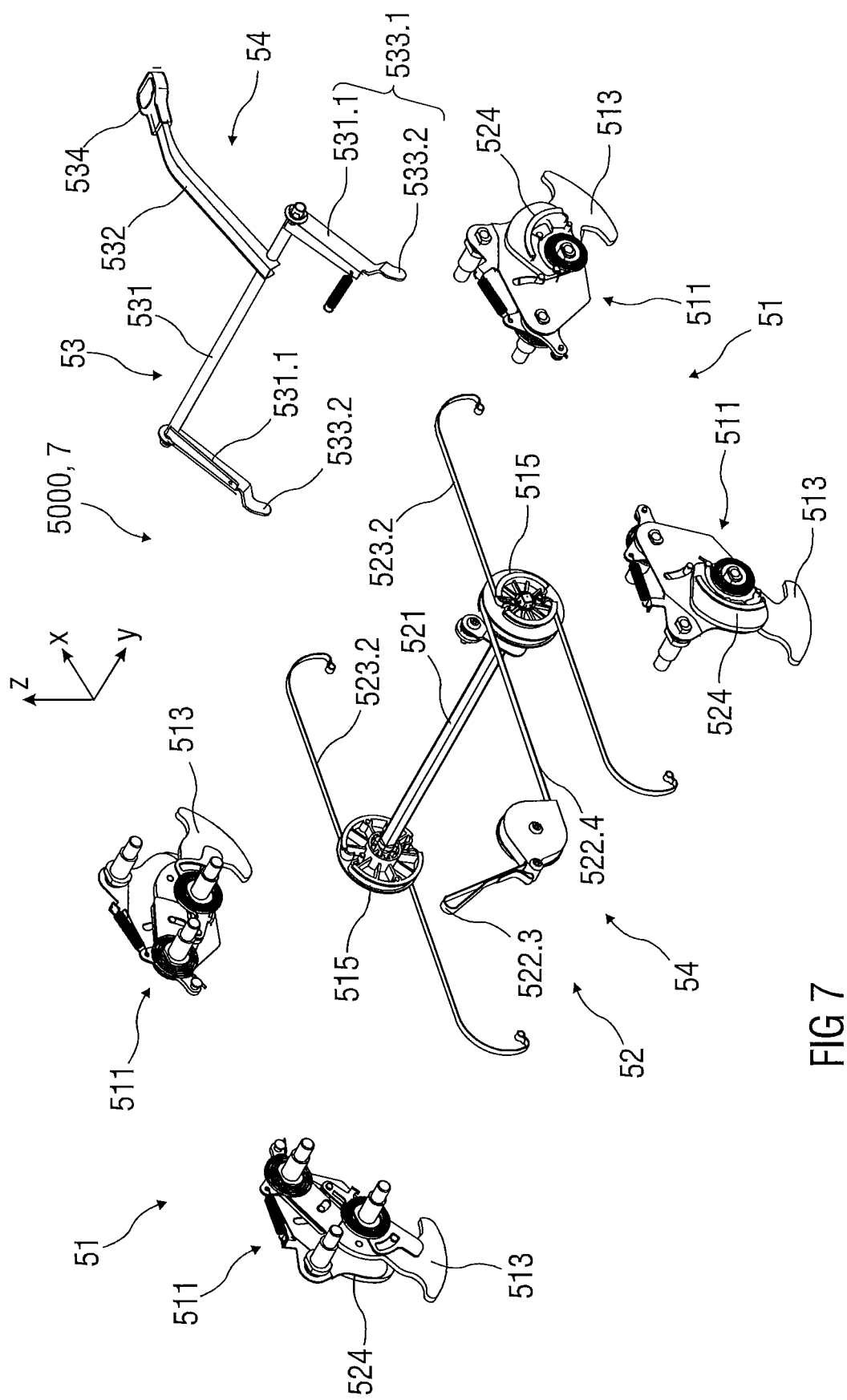

FIGS. 6 and 7 schematically show, in an exploded illustration and in a perspective view, a third embodiment of a modular fastening arrangement 5000 (called third fastening arrangement 5000 below). The carrier or frame 50.1 and the lock adapter 50.2 of the first fastening arrangement 50 are omitted in this embodiment. Said third fastening arrangement 5000 therefore comprises fewer parts and modules. In these FIGS. 6 and 7, the rail arrangement 2 is not illustrated for the sake of clarity.

The third modular fastening arrangement 5000 comprises, as lock module 51, four lock units 511 with integrated carrier elements 512. The integrated carrier elements 512 serve for fastening the seat 1 in a manner not illustrated specifically. The third modular fastening arrangement 5000 differs in the type of lock unlocking means which comprises a cable pull mechanism instead of an articulated mechanism as the unlocking unit 514.

The four lock units 511 each comprise, analogously to the second modular fastening arrangement 500, a blocking element 513 for the releasable locking on or in the rail arrangement 2. The respective blocking element 513 is designed, for example, as a blocking hook 517.

Furthermore, a pair of lock units 511 is in each case coupled in terms of movement to one another by an associated unlocking unit 514, for example unlocking lever or unlocking arm. For example, the unlocking unit 514 is designed as a deflecting pulley 515 which is actuable by the lock actuating unit 522. Instead of a lever arm 522.1, 522.2, the lock actuating unit 522 comprises a lock actuating cable 522.4. A gripping element 522.3, in particular a cable loop, is arranged at the free end of the lock actuating cable 522.4.

The lock unlocking module 52 comprises, as first carrier 521, a transmission rod, the lock actuating unit 522, which is designed as an integral actuating unit 541, and the lock unlocking mechanism 523. The first carrier 521 of the lock unlocking module 52 is designed as a transverse rod or a transverse tube.

The lock actuating unit 522 is designed as a cable pull mechanism. The cable pull mechanism comprises the lock actuating cable 522.4 which is provided with the gripping element 522.3. The lock actuating cable 522.4 is arranged via the deflecting pulley 515 on the first carrier 521 for rotation therewith, such that, when the lock actuating cable 522.4 is actuated, the first carrier 521 is rotated at the same time by the gripping element 522.3 in order to actuate the unlocking unit 514, in particular the deflecting pulley 515, which, in turn, is coupled, in particular coupled in terms of movement, to the lock unlocking mechanism 523.

The lock unlocking mechanism 523 is designed as a pull mechanism, in particular a cable pull mechanism, which is coupled, in particular coupled in terms of movement, to the lock units 511 in the assembled state. The cable pull mechanism has two cable pulls 523.1 and 523.2 which are both designed as a lock unlocking cable. The two cable pulls 523.1 and 523.2 are respectively coupled at one end to one of the front lock units 511 and are coupled at the other end to one of the rear lock units 511. For this purpose, each lock unit 511 has an associated winding unit 524.

By actuation of the lock actuating cable 522.4 and driving the deflecting pulley 515, the two cable pulls 523.1 and 523.2 are actuated, as a result of which the associated lock units 511 are unlocked or locked by winding said cable pulls onto or unwinding them from the winding units 524.

The rail unlocking module 53 comprises at least the second carrier 531, the rail actuating unit 532, which is designed as an integral actuating unit 541, and the rail unlocking mechanism 533 (not illustrated specifically in FIGS. 6 and 7, and constructed analogously as shown in FIGS. 4 and 5 and described with regard thereto).

The rail actuating unit 532 is designed as a lever arm. The rail unlocking mechanism 533 is designed as a pull mechanism, articulated mechanism and/or bar mechanism, which, in the assembled state, is coupled, in particular coupled in terms of movement, to the locking element 4 for unlocking the rail or locking the rail, and/or to the lock units 511. In order to actuate the rail unlocking mechanism 533, the associated integral actuating unit 541 comprises the gripping unit 534.

Depending on the design of the rail locking means, one locking element 4 can be provided per pair of rails 3. Alternatively, just one locking element 4 in one of the pairs of rails 3 can also be provided per rail arrangement 2. Accordingly, the rail unlocking mechanism 533 can comprise one or two rail unlocking units 533.1.

During the removal or final installation and fastening of the seat 1 from or on the rail arrangement 2, in said third fastening arrangement 5000 the lock unlocking module 52 and the rail unlocking module 53 are coupled in terms of movement to one another. For this purpose, the respective deflecting pulley 515 is coupled in terms of movement to the rail unlocking mechanism 533, in particular is coupled in terms of movement to an associated rail unlocking arm 533.2.

Figure 8:
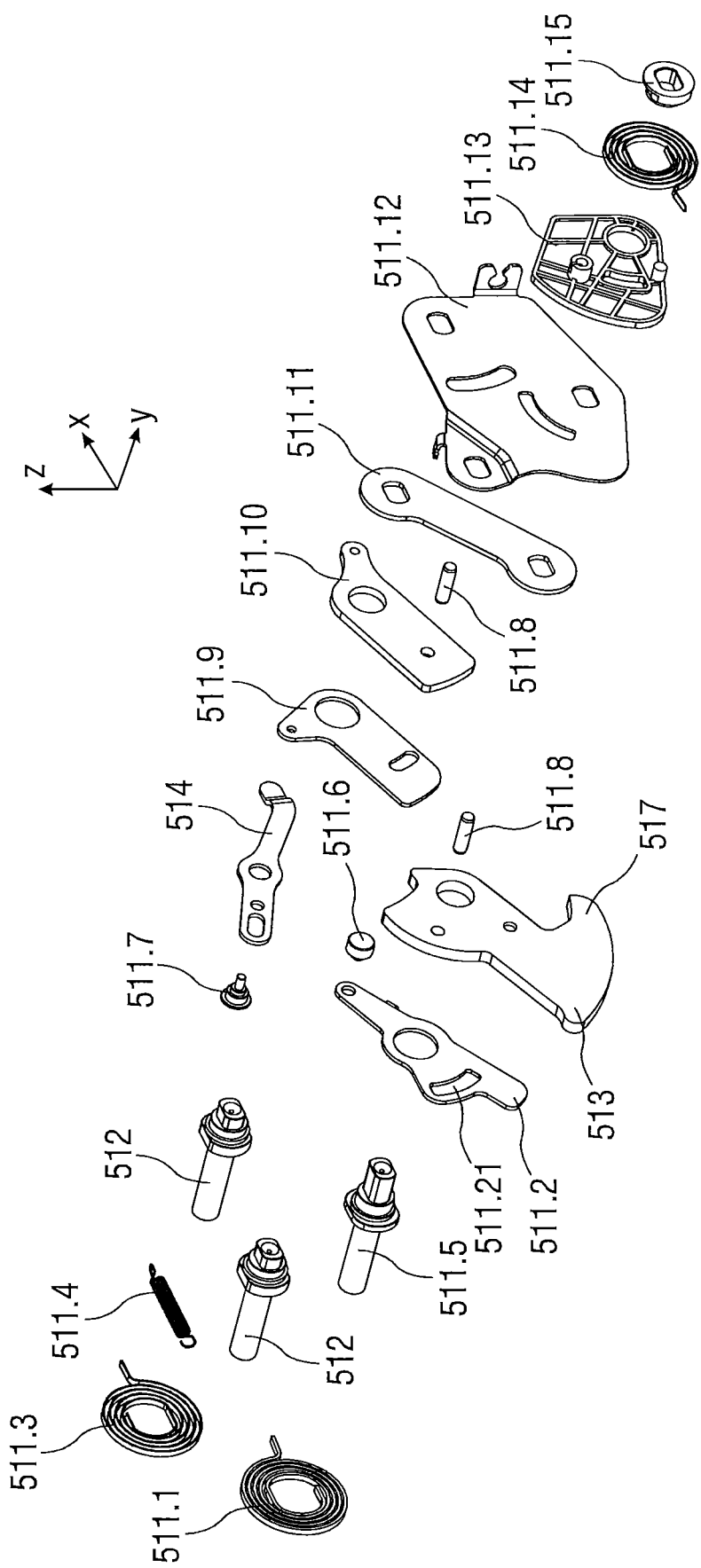

FIG. 8 schematically shows, in an exploded illustration, an exemplary embodiment of a lock unit 511. All of the lock units 511 of the lock module 51 are constructed analogously.

The respective lock unit 511 comprises at least:

one first spring element 511.1 (also called "spring control element") for a control element 511.2 (also called "control element")
one second spring element 511.3 (also called "spring crash cam"),
two carrier elements 512 (also called "bolt cam")
one compensating spring 511.4 (also called "spring tolerance cam") for compensating for tolerances between the carrier elements 512,
one blocking hook holder 511.5 (also called "bolt hook") for the blocking hook 517,
one holding pin 511.6 (also called "pin control element") for the control element 511.2,
the unlocking unit 514 (also called "link track rod"),
one coupling pin 511.7 (also called "pin cam link"),
the blocking element 513 with the blocking hook 217 (also called "crash hook"),
two guide pins 511.8 (also called "pin ISO 8734 6×20"),
one compensating element 511.9 (also called "tolerance cam"),
one crash cam element 511.10 (also called "crash cam"),
one reinforcing element 511.11 (also called "reinforcement plate"), optionally for reinforcing the carrier plate 511.12,
one carrier plate 511.12 (also called "side plate"),
one triggering plate 511.13 (also called "release plate"),
one third spring element 511.14 for a triggering arm (also called "spring release lever"), and
one bearing bushing 511.15 for the third spring element 511.14 (also called "bush spring").

Figure 9:
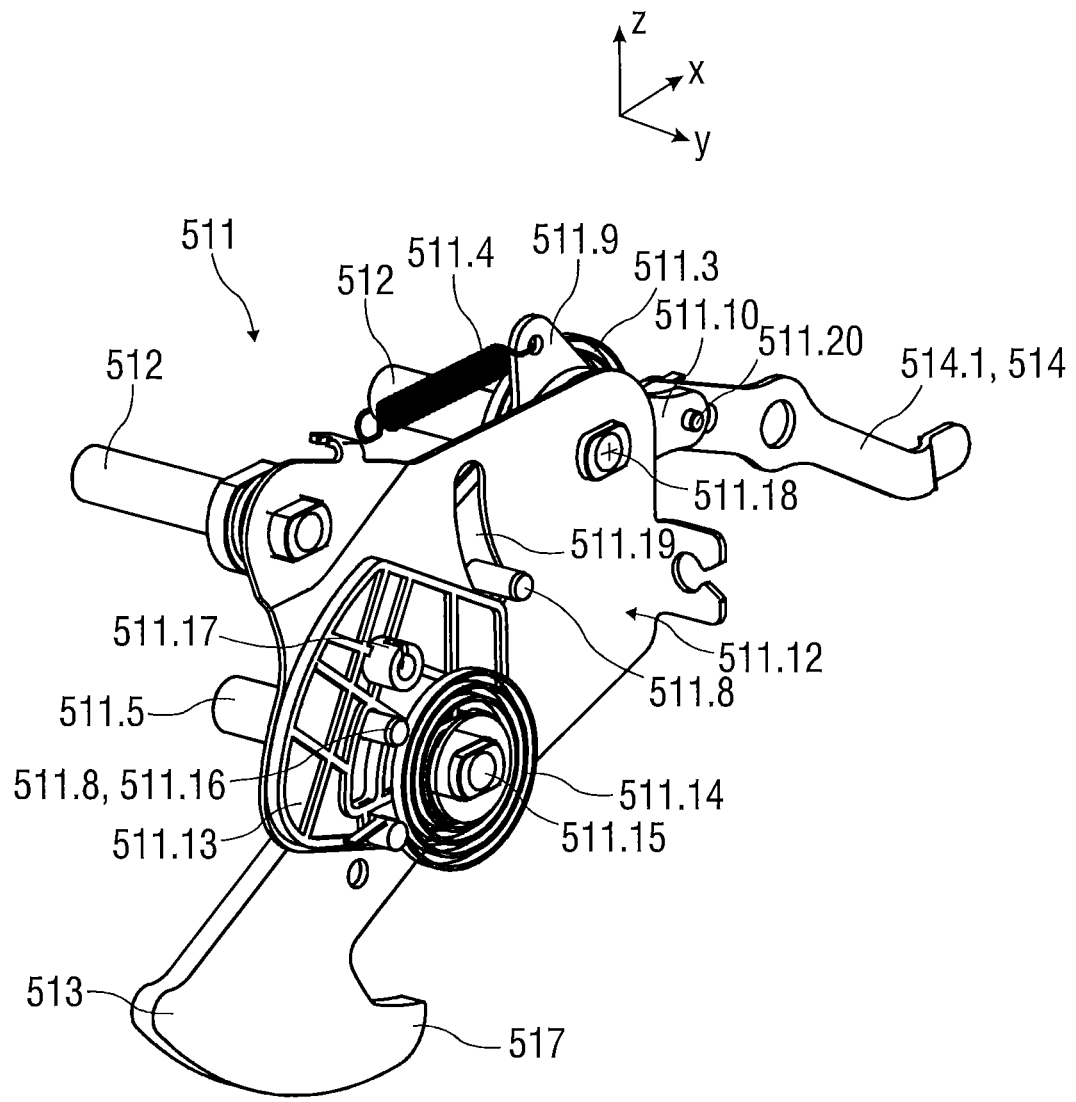

FIG. 9 shows the lock unit 511 preassembled in the assembled state as a preassembly unit.

The triggering plate 511.13 comprises an entraining pin 511.16 as a guide pin 511.8. Furthermore, the triggering plate 511.13 comprises a receptacle 511.17, in particular a slot, for receiving and holding one end of the associated cable pull 523.1. The third spring element 511.14 is designed as a restoring spring.

The respective lock module 51 can be actuated differently:

actuation by the lock unlocking mechanism 523 or
actuation via the unlocking unit 514 by the rail unlocking module 53 and thus synchronous actuation of the rail unlocking mechanism 533 for the locking elements 4 of the rail arrangement 2 and of the unlocking units 514 for the lock units 511.

When the cable pull 523.1 is actuated to unlock the lock unit 511, in particular to pivot the blocking hook 517 and therefore to release the blocking hook 517 from the upper rail 31, the triggering plate 511.13 is entrained and moved, in particular rotated, by the entraining pin 511.16. As a result, the third spring element 511.14 is tensioned and the blocking element 513 and therefore the blocking hook 517 are pivoted. The blocking hook 517 is positioned into an unlocking position and thus released from the upper rail 31.

If the actuation is ended, the triggering plate 511.13, the blocking element 513 and the blocking hook 517 are reset by the third spring element 511.14 into their starting position which corresponds to a locking position.

During the actuation of the unlocking unit 514 by the rail unlocking module 53, in particular the rail unlocking unit 533.1, the crash cam element 511.10 is forcibly guided, in particular rotated by the guide pin 511.8 about an axis of rotation 511.18. The guide pin 511.8 arranged on the cam element 511.10 is guided in a guide slot 511.19. For this purpose, the crash cam element 511.10 is connected in an articulated manner to the unlocking unit 514 at the point of articulation 511.20. The crash cam element 511.10 entrains the blocking element 513 by the coupling via the compensating element 511.9 and the control element 511.2. The blocking element 513 is moved from the locking position into the unlocking position. For this purpose, the control element 511.2 has the guide slot 511.21 (illustrated in FIGS. 5, 6 and 8) into which the guide pin 511.8 (illustrated in FIGS. 5 and 6), which is arranged on the blocking element 513, is guided when the blocking element 513 is moved from the locking position into the unlocking position.

Figure 10:
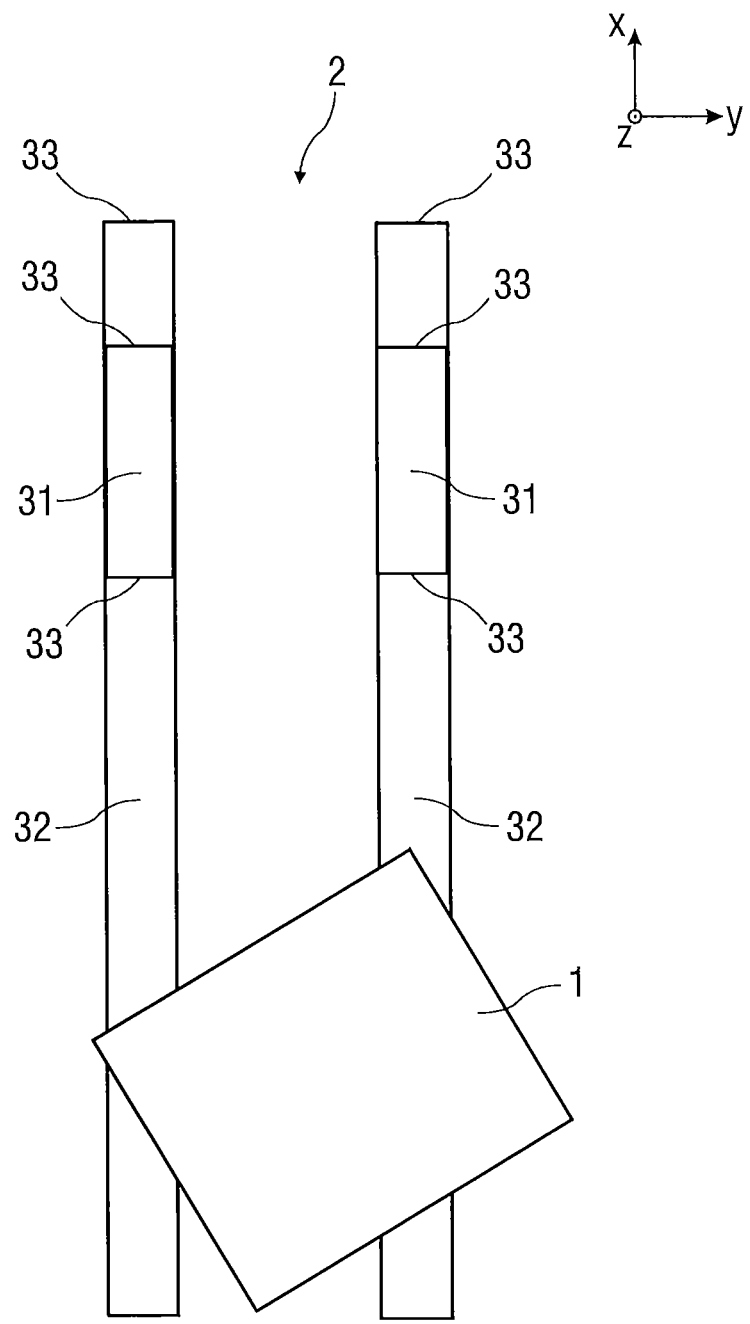
FIG. 10 shows a schematic illustration of a releasable seat on a rail arrangement.

FIG. 10 shows a schematic illustration of a releasable seat 1 on the rail arrangement 2. In order to install the seat 1, the latter is to be arranged on the rail arrangement 2, in a region in which the lower rail 32 is free of the upper rail 31.

FIG. 11 shows a schematic illustration of the seat 1 pre-positioned on the rail arrangement 2. The seat 1 is pre-positioned here by rolling elements 6 on its lower side on the lower rail 32. The lock module 51 is open. The seat 1 is guided on sliding surfaces of the lower rail 32 (or alternatively of the upper rail 31, not illustrated) by the rolling elements 6 and pre-positioned in such a manner that the lock units 511 are positioned above the rail ends 33 of the upper rail 31.

FIGS. 12 to 20F show schematic illustrations of various embodiments and the movement sequences thereof during the unlocking or locking of one of the fastening arrangements 5, 50, 500, 5000 from or on the rail arrangement 2.

Figure 12:
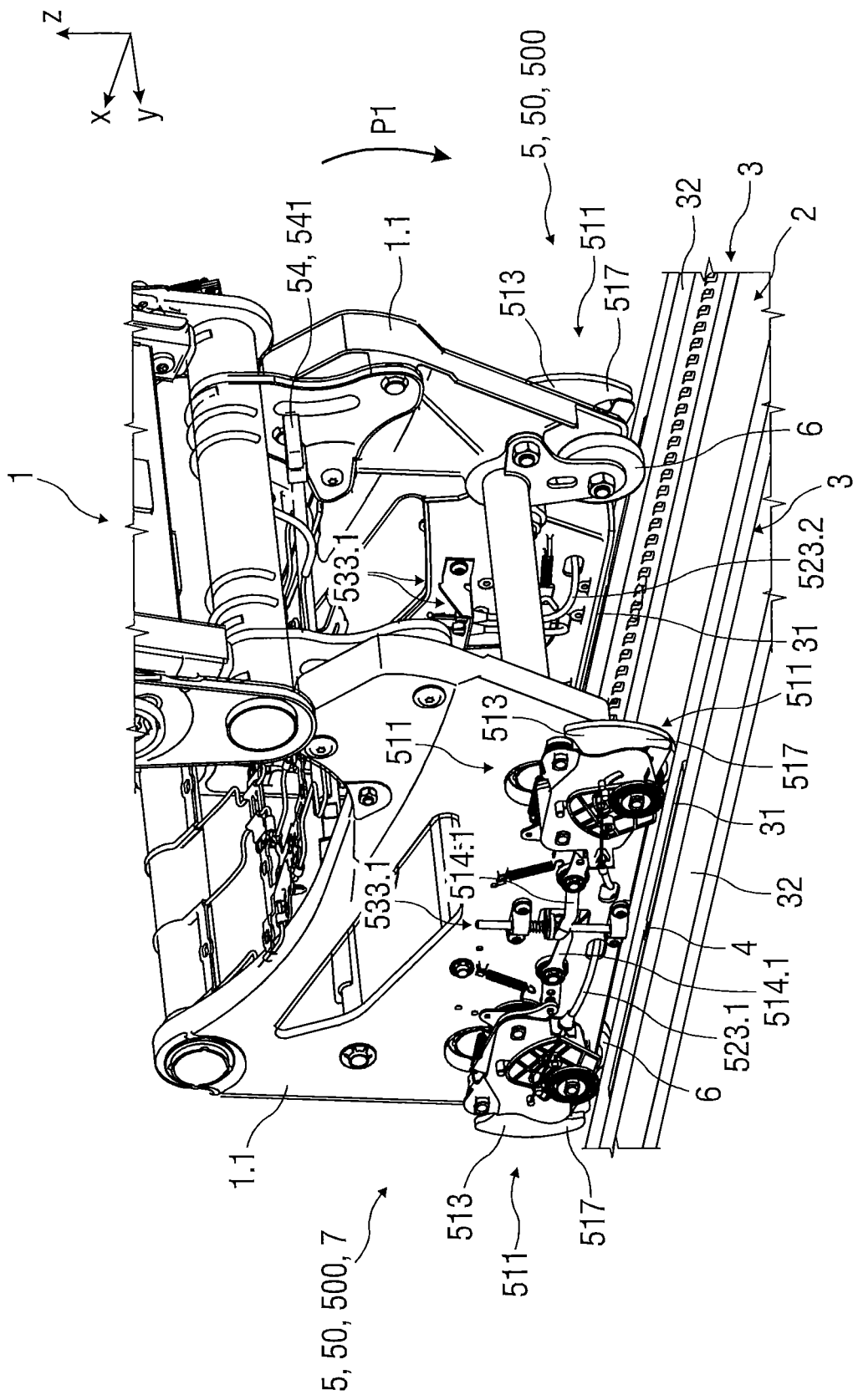
FIG. 12 shows a schematic perspective view of one embodiment of a fastening arrangement in the unlocked or open state.

FIG. 12 shows, as actuating module 54, a lever arrangement which, in order to release the fastening arrangement 5, 50 or 500, is actuable downwards in the direction of the rail arrangement 2, according to arrow P1, in order to allow the blocking elements 513 of the lock units 511 to drop into the lower rails 32 of the rail arrangement 2, in particular into a receiving slot of the U-shaped lower rails 32. For the description of the fastening arrangements 5, 50 and 500, reference is made to FIGS. 1 to 5 and 8 to 11.

In FIG. 12, the fastening arrangement 5, 50 or 500 is shown in the unlocked or open state. The lever arms 514.1 and therefore the blocking elements 513 are raised here as a result of the upwardly actuated actuating module 54, in particular the actuating unit 541. In this state, the seat 1 with the fastening arrangement 5, 50 or 500 can be pre-positioned on the lower rail 32 by the rolling elements 6.

The seat 1 comprises two lateral seat carriers 1.1. Each pair of rails 3 is assigned a seat carrier 1.1.

The lock units 511 with the blocking elements 513 are each arranged here on an outer side of the seat carriers 1.1. The rolling elements 6 are arranged on an inner side of the seat carriers 1.1. The actuating module 54 is arranged between the two seat carriers 1.1 and connected via passage openings in the seat carriers 1.1 to the outer lock module 51. Components of the lock unlocking module 52 and/or of the rail unlocking module 53 are partially or completely arranged on the inner side and/or the outer side of the seat carriers 1.1.

When the actuating unit 541 is actuated downwards according to arrow P1, the blocking elements 513, in particular the blocking hooks 517, then engage in an arresting manner on the rail ends 33 of the upper rail 31. In particular, the blocking elements 513 of the lock units 511 drop into the respective receiving slot of the U-shaped lower rails 32 and reach under the rail ends 33 of the upper rail 31 such that the seat 1 is fastened in a vertically secured manner to the rail arrangement 2.

Figure 13:
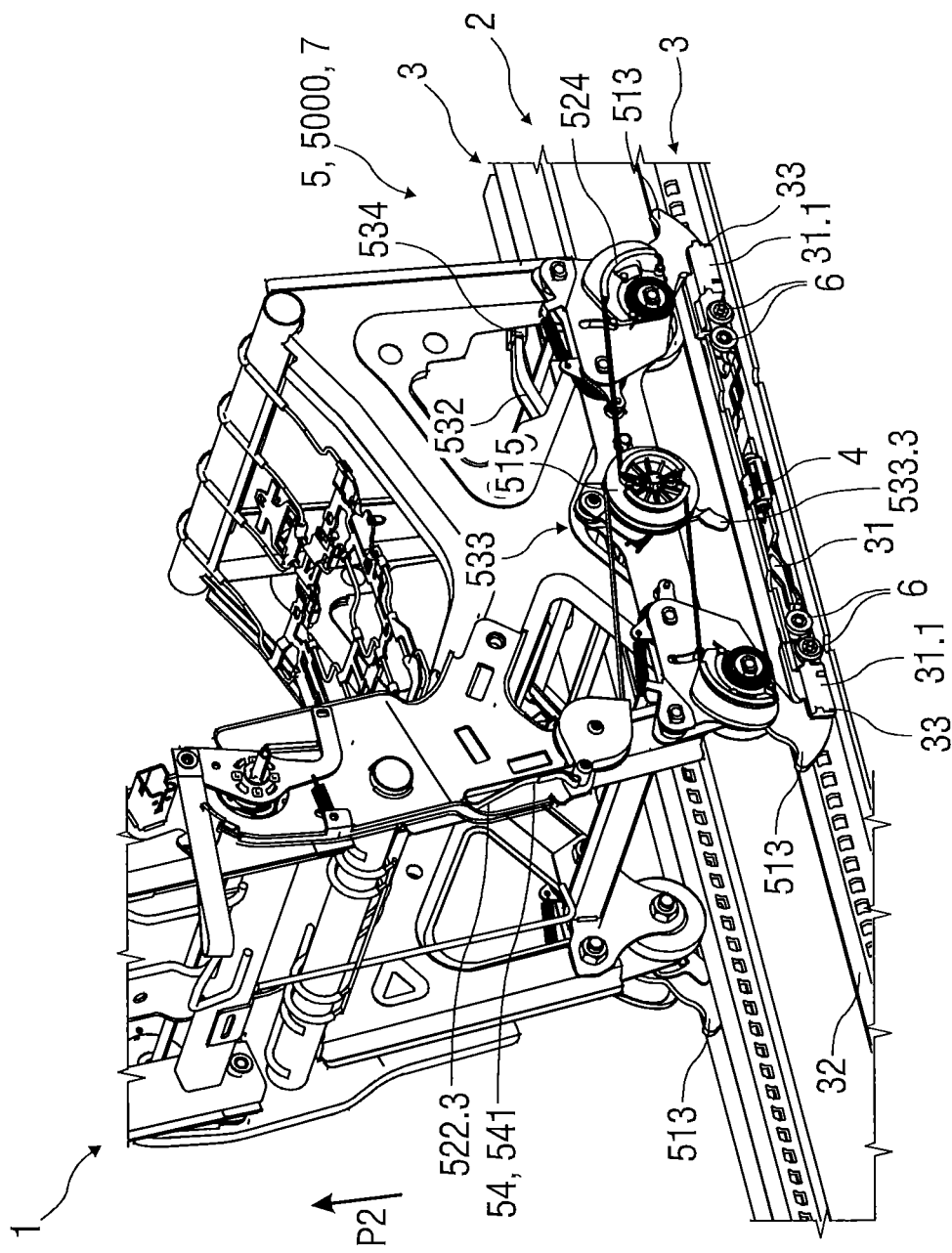
FIG. 13 shows a schematic perspective view of one embodiment of an actuating module.

FIG. 13 shows, as actuating module 54, the previously described cable pull mechanism which, in order to release the third fastening arrangement 5000, is actuable upwards away from the rail arrangement 2, according to arrow P2, in order to release the blocking elements 513 of the lock units 511 from the rail arrangement 2.

In order to arrest the blocking hooks 517 on the respective upper rail 31, the respective upper rail 31 comprises a hook receptacle 31.1 at each of its rail ends 33. The upper rail 31 is arranged movably in the lower rail 32 by further rolling elements 6, in particular in each case two rolling elements 6 in the region of each rail end 33. In particular, the hook receptacles 31.1 form the respective rail end 33. The rolling elements 6 are arranged in the upper rail 31 between the two hook receptacles 31.1, in particular substantially adjacent to them, and roll on a base surface of the lower rail 32.

For the description of the fastening arrangements 5 and 5000, reference is made to FIGS. 1, 6 and 7, and 10 to 11.

Figure 14A:
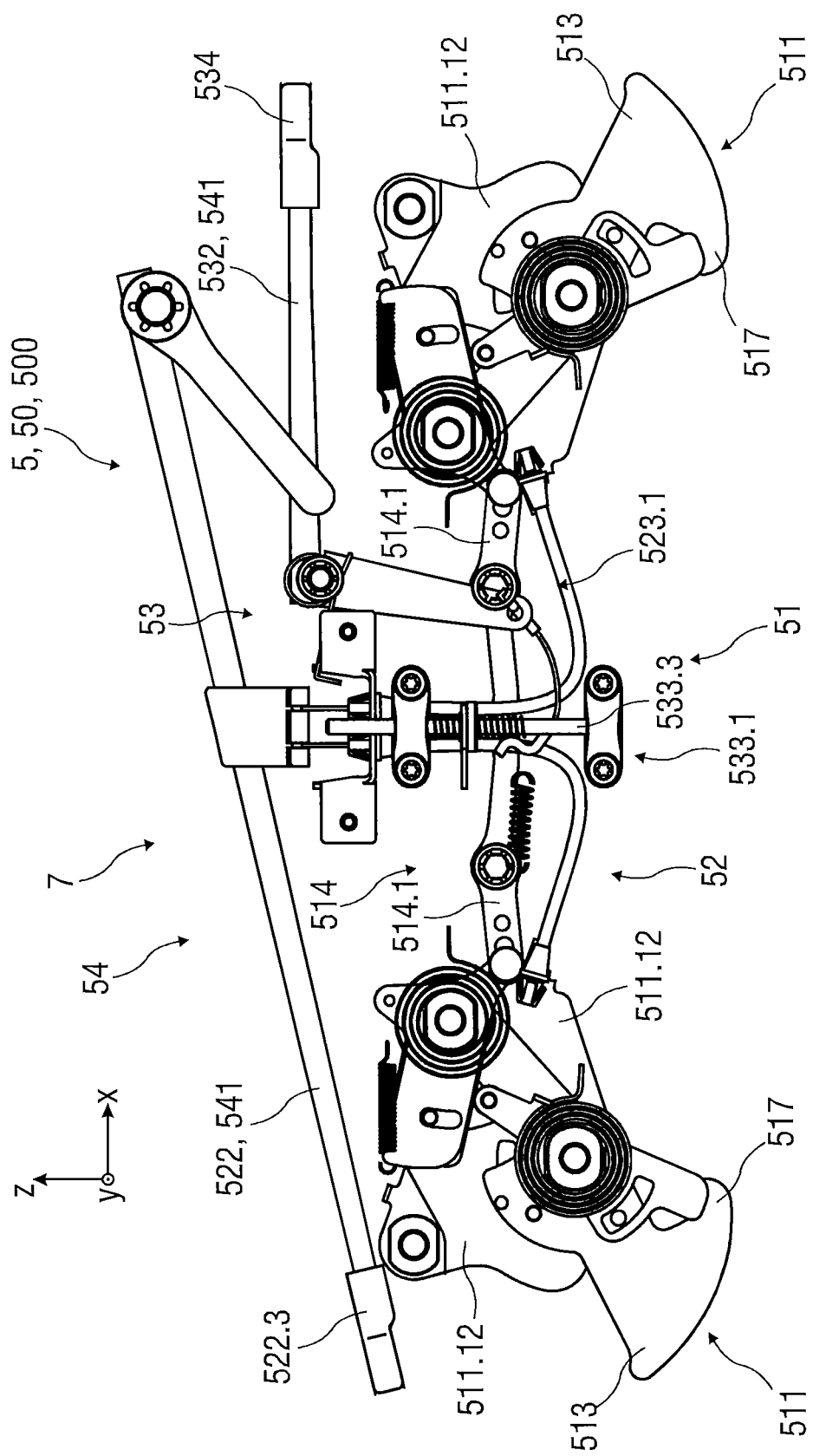
FIG. 14A shows a schematic side view of one embodiment of a carrier plate of a lock unit.

FIG. 14A shows a side view of the fastening arrangement 5, 50 or 500 with the docking mechanism 7 in order to mount or to remove the respective fastening arrangement 5, 50 or 500 on or from the rail arrangement 2. The side view means that only half of the fastening arrangement 5, 50 or 500 is shown with the two lock units 511 and the lock unlocking mechanism 523 with one of the cable pulls 523.1 for one of the pairs of rails 3. The other part of the docking mechanism 7 for the other pair of rails 3 is constructed analogously, as previously described. The actuating module 54 is configured in such a manner that it can actuate the two parts synchronously, as has been previously described in more detail with reference to FIGS. 1 to 5 and 8 to 13.

FIG. 14A shows, in the side view, that side of the carrier plate 511.12 of the respective lock unit 511 which forms an outer side in the mounted state on the seat carriers 1.1.

Figure 14B:
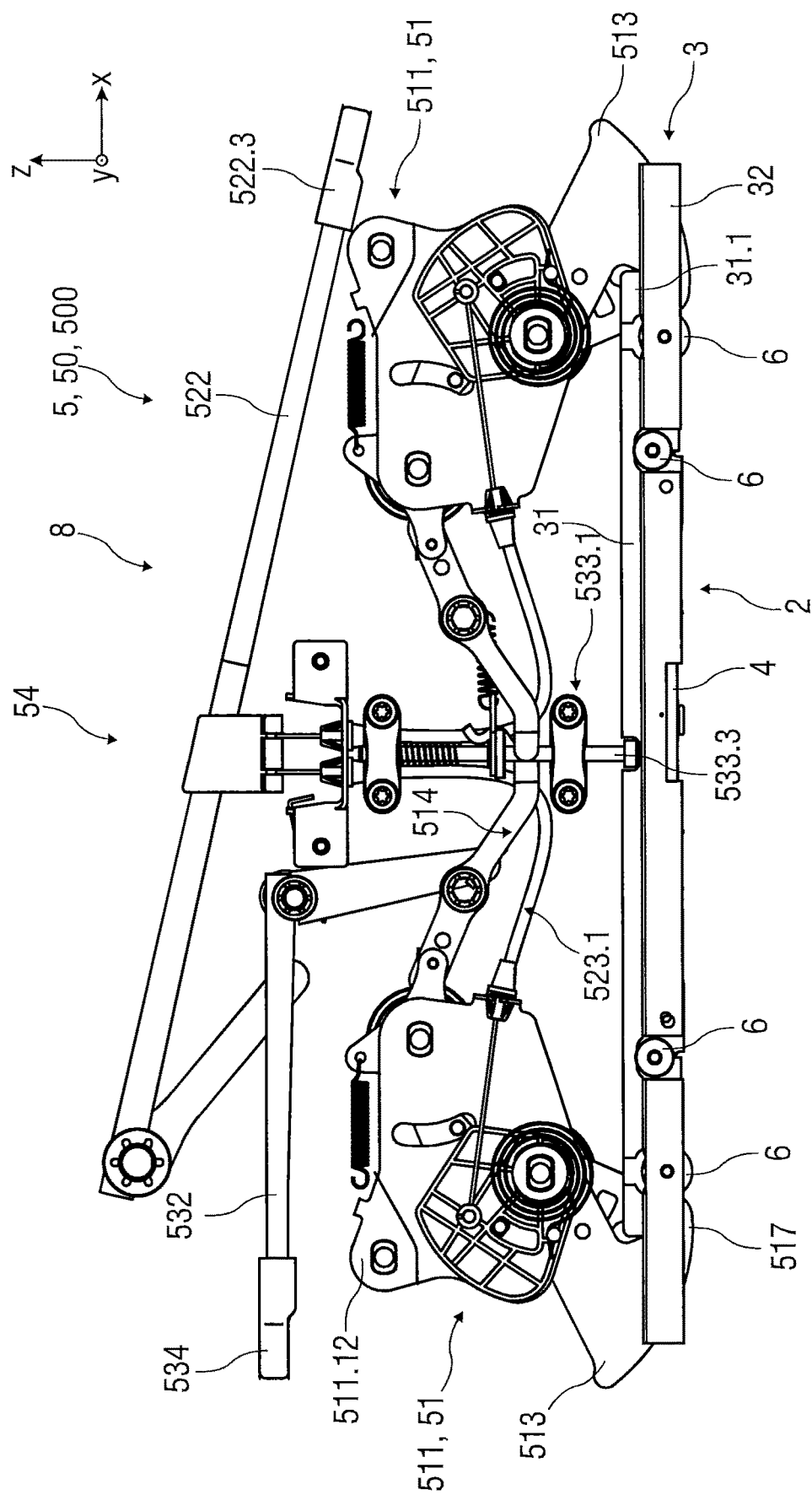
FIG. 14B shows a schematic side view of one embodiment of an unlocking mechanism on the carrier plate of a lock unit.

FIG. 14B shows an unlocking mechanism 8 which is provided on the opposite side of the carrier plate 511.12 of the respective lock unit 511 in order to arrest the respective fastening arrangement 5, 50 or 500 on the rail arrangement 2 for the fastening of the seat 1 or to release same therefrom and to unlock the rail locking means, in particular the locking elements 4 of the pairs of rails 3, synchronously.

The unlocking mechanism 8 is designed as a lever mechanism and/or articulated mechanism for unlocking the rails in combination with a cable mechanism for unlocking the lock.

Figure 15:
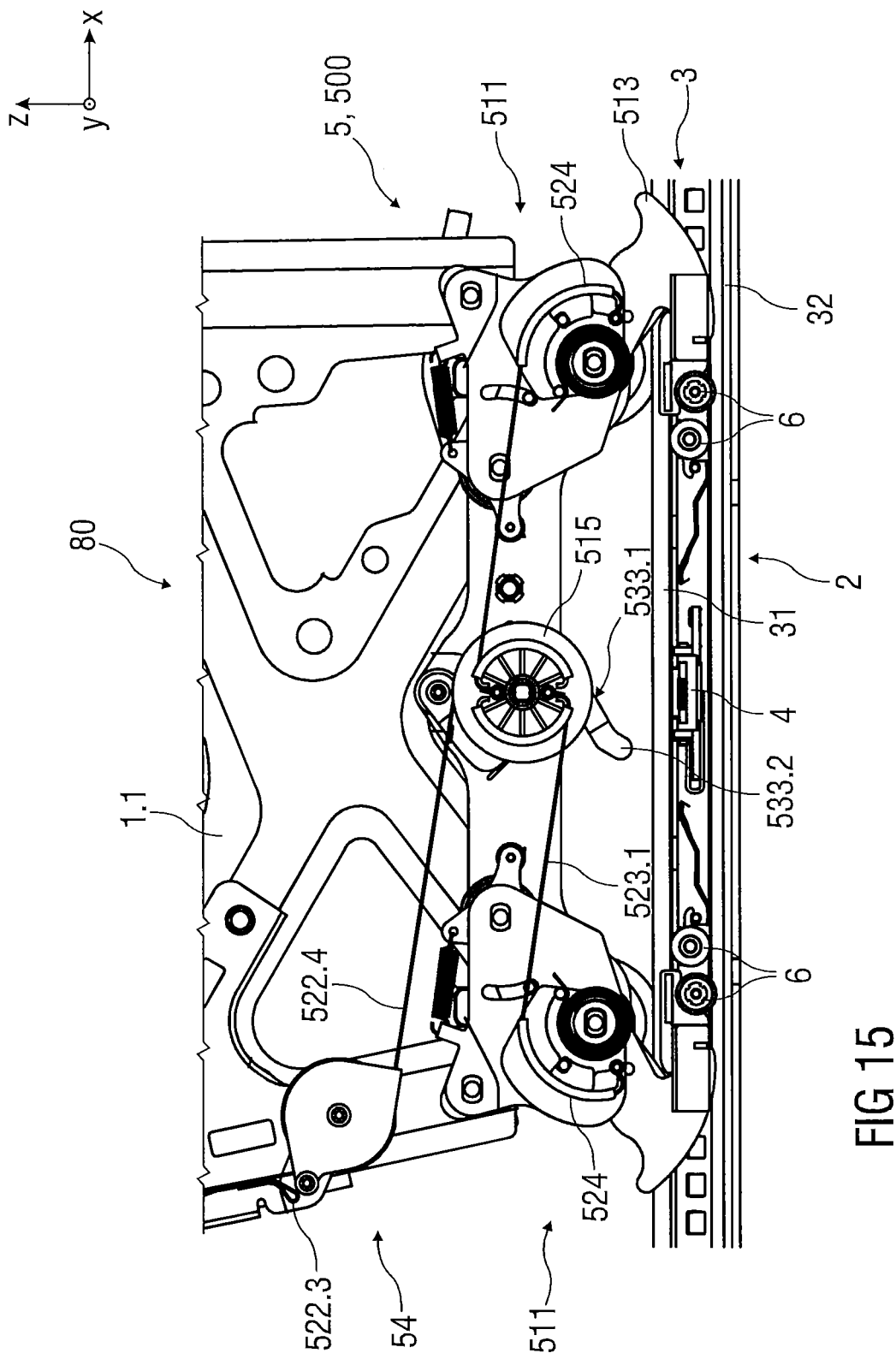
FIG. 15 shows a schematic side view of one embodiment of an alternative unlocking mechanism.

FIG. 15 shows an alternative unlocking mechanism 80 which is designed as a cable pull mechanism and corresponds to the previously described third fastening arrangement 5000. FIG. 15 shows the fastening arrangement 5000 which is arranged between the seat 1 and the rail arrangement 2 and releasably locks the seat 1 to the rail arrangement 2 using the lock units 511.

Figure 16B:
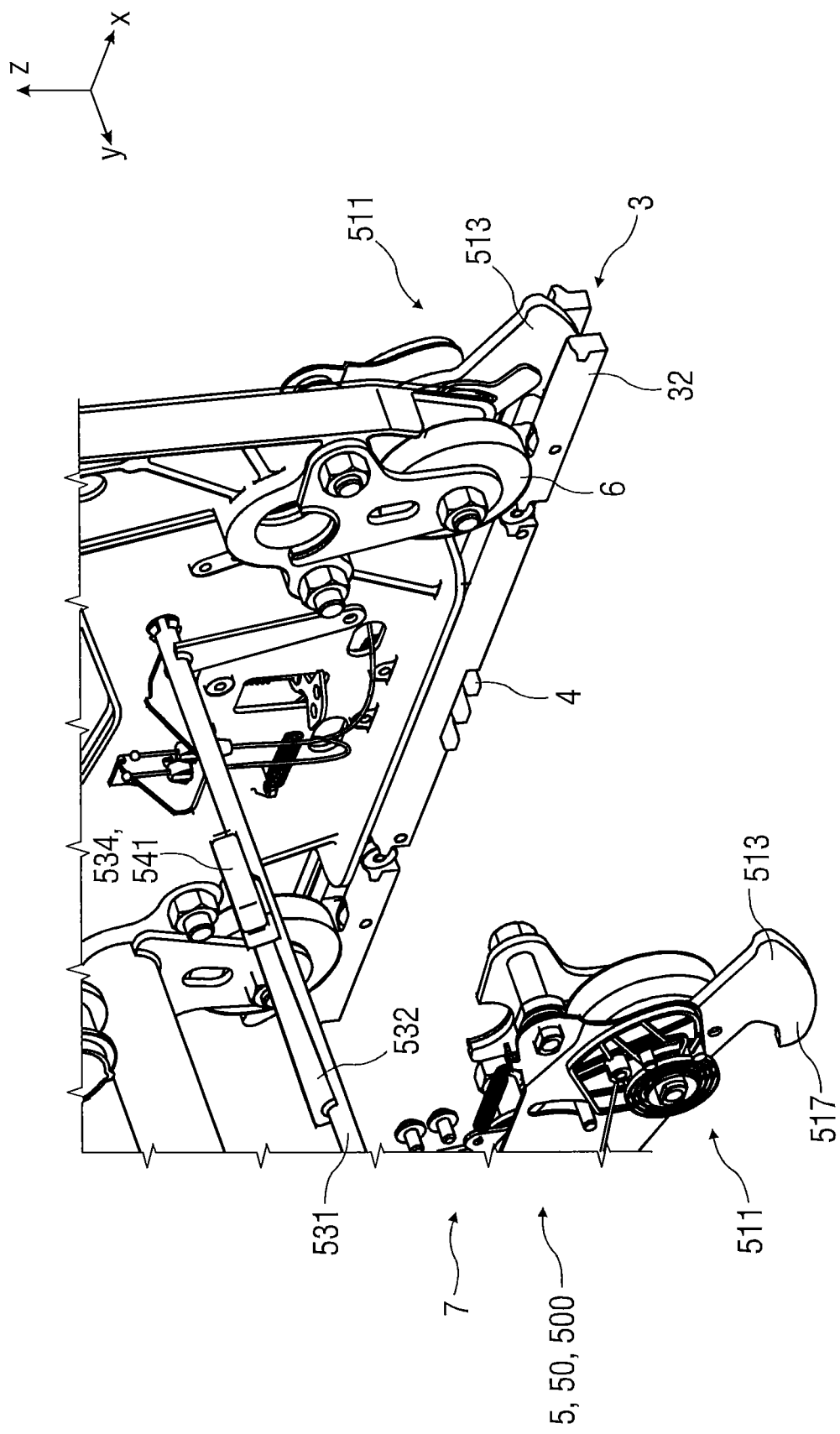
FIG. 16B shows a schematic perspective view of one embodiment of blocking elements.

FIGS. 16A and 16B show the blocking elements 513 of two lock units 511 on one of the pairs of rails 3 being unlocked by a lever mechanism corresponding to the unlocking mechanism 8.

By pulling the rail unlocking arm 533.2 upwards in accordance with arrow P3, the rail unlocking mechanism 533 is actuated, in particular the second carrier 531, which is designed as an unlocking rod, is rotated such that the unlocking units 514 are actuated in accordance with arrow P4 and the locking element 4 is unlocked, and thus the rails 31, 32 are released. The release of the rails 31, 32 in the "vis-à-vis" position leads to increased complexity since the unlocking rod has to be rotated in the same direction both on the inner side and on the outer side of the carrier plate 511.12, with the pulling direction on one side being switched over in the opposite direction.

Figure 17A:
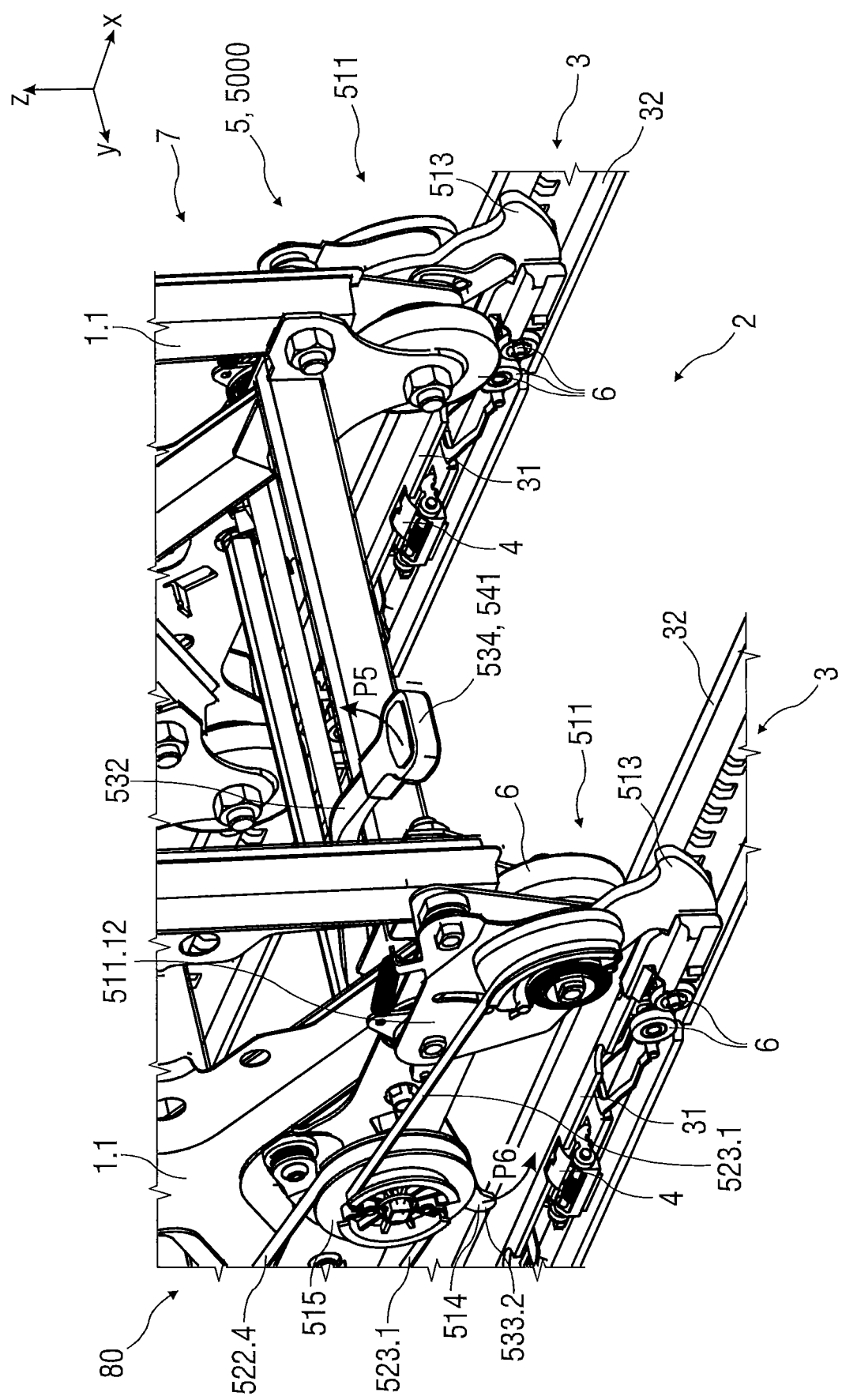
FIG. 17A shows a schematic perspective view of one embodiment of blocking elements.
Figure 17B:
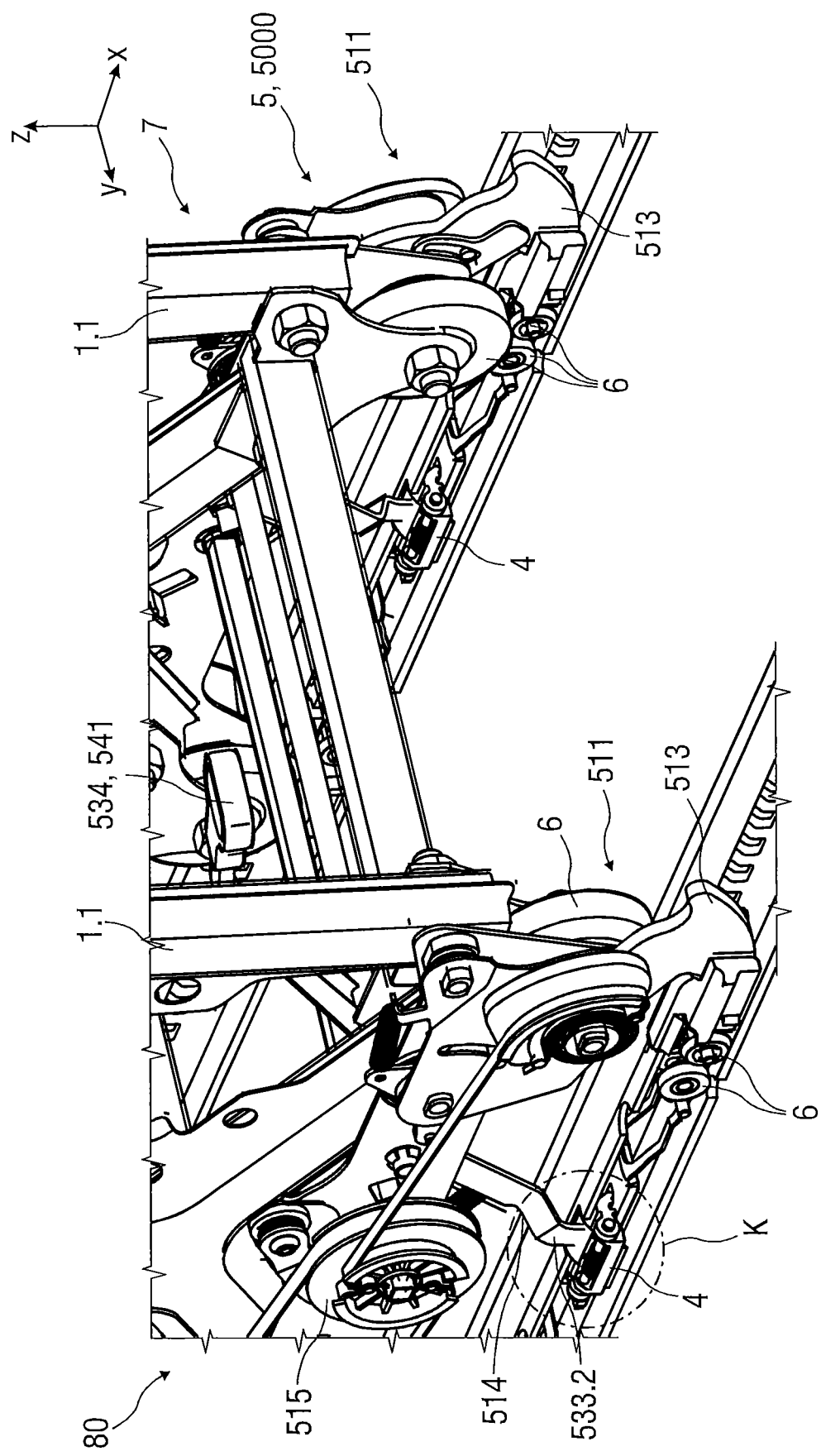
FIG. 17B shows a schematic perspective view of one embodiment of blocking elements.

FIGS. 17A and 17B show the blocking elements 513 of two lock units 511 on one of the pairs of rails 3 being unlocked by a cable pull mechanism corresponding to the unlocking mechanism 80 for the third fastening arrangement 5000. The rail actuating unit 532 is pivoted or pulled upwards in accordance with arrow P5. As a result, the unlocking unit 514 is moved, in particular pivoted, downwards, in accordance with arrow P6, in order to unlock the rail locking means, in particular the locking element 4.

The direct unlocking of the rail arrangement 2 is undertaken by pressing down the locking element 4, for example an unlocking plate, vertically in the upper rail 31 (also called rail runner) and reduces the complexity and possible problems when latching the unlocking unit 514, for example an unlocking lever, unlocking arm or unlocking pin, into an unlocking bushing of the upper rail 31 (rail runner) during the docking operation. The triggering mechanism or unlocking mechanism according to circle K functions both in the "forwardly directed" position and in the "vis-à-vis" position.

Figure 18A:
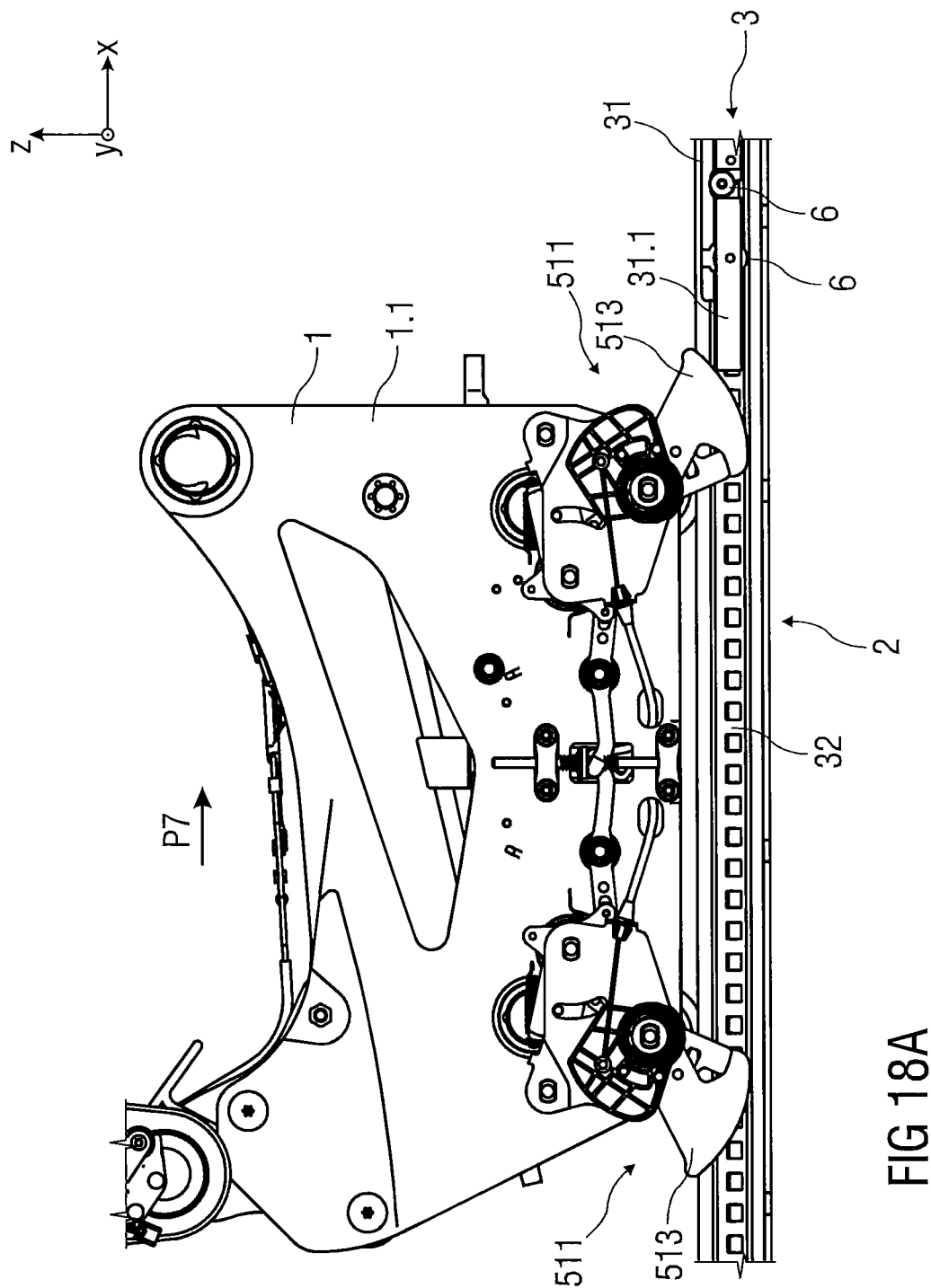
FIG. 18A shows a schematic side view of one embodiment of a portion of the seat in a movement sequence.

FIG. 18A shows the seat 1 which rolls along the lower rail 32 in the direction of the upper rail 31 in accordance with arrow P7. The blocking elements 513 are guided in slot-shaped openings in the U-shaped lower rail 32.

Figure 18B:
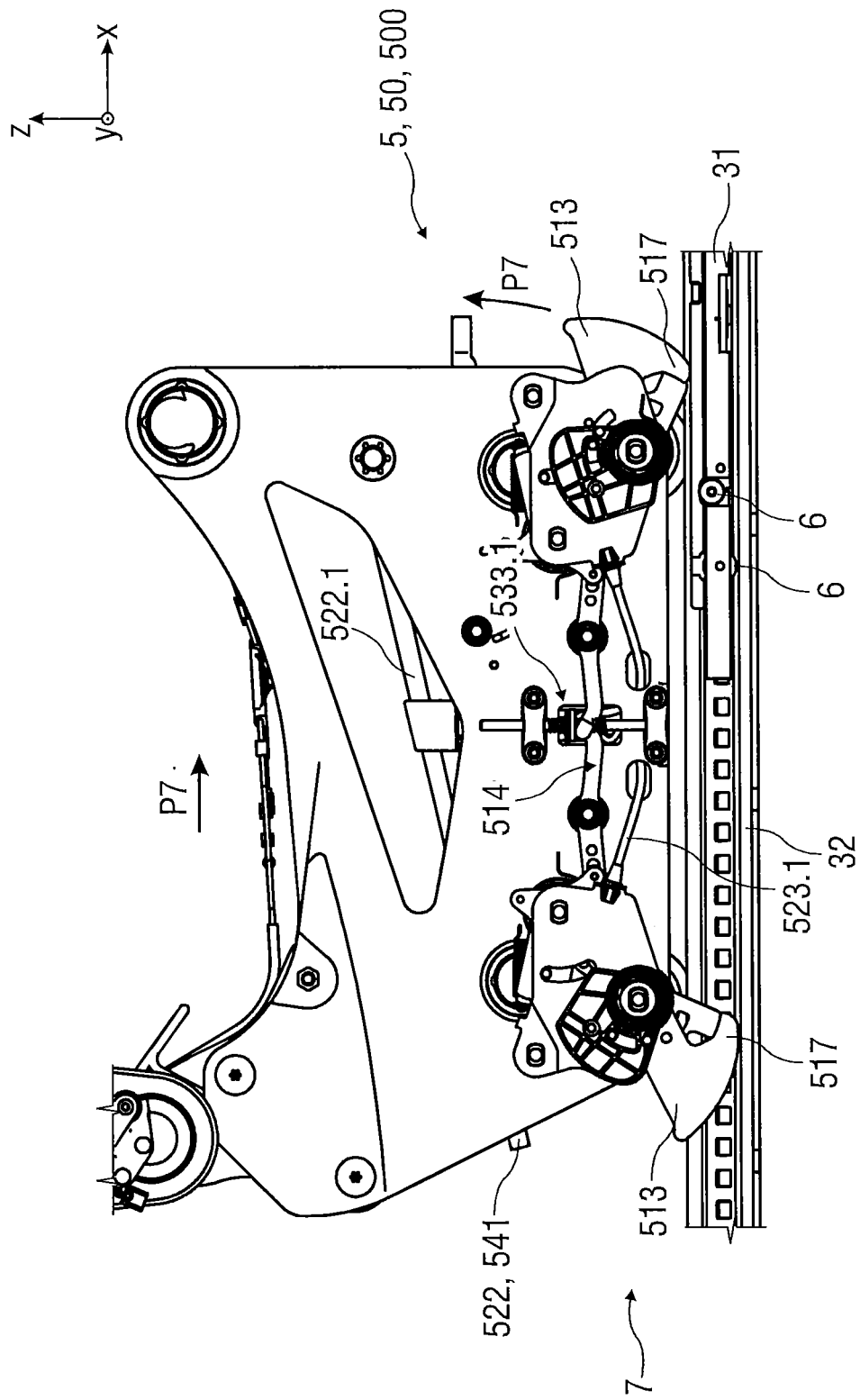
FIG. 18B shows a schematic side view of one embodiment of a portion of the seat in a movement sequence.

FIG. 18B shows the lifting of the front blocking element 513 of the front lock unit 511 out of the lower rail 32, wherein, during the further movement of the seat 1 in the direction of the preassembled upper rail 31, the blocking element 513 is pushed onto the upper rail 31 and moved along the latter.

Figure 18C:
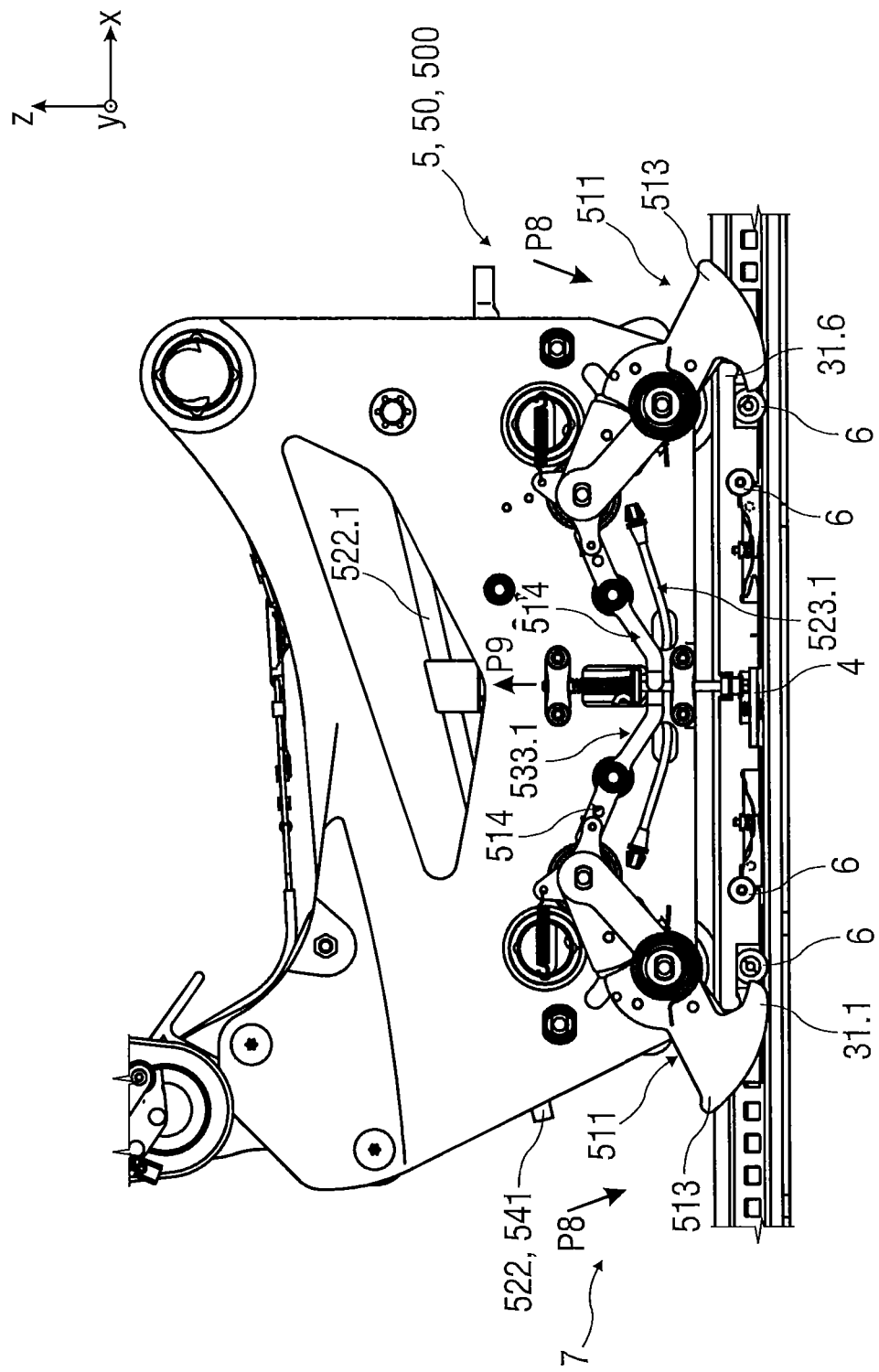
FIG. 18C shows a schematic side view of one embodiment of a portion of the seat in a movement sequence.

FIG. 18C shows the state of the fastening arrangement 5 (50, 500 or 5000) after the seat 1 has been moved forward to such an extent that the upper rail 31 strikes against the rear blocking element 513, wherein, owing to restoring elements, the front blocking element 513 latches again automatically into the upper rail 31 in accordance with arrow P8 and therefore the two lock units 511 are fully latched into place. In this position, the rail unlocking unit 533.1, in particular a track rod, drops into the upper rail 32 (also called running rail or track slider) such that an arresting connection in accordance with arrow P9 is produced and the seat 1 is arrested on the rail arrangement 2 by the fastening arrangement 5, 50 or 500 and the locking element 4 that has been latched into place.

Figure 18D:
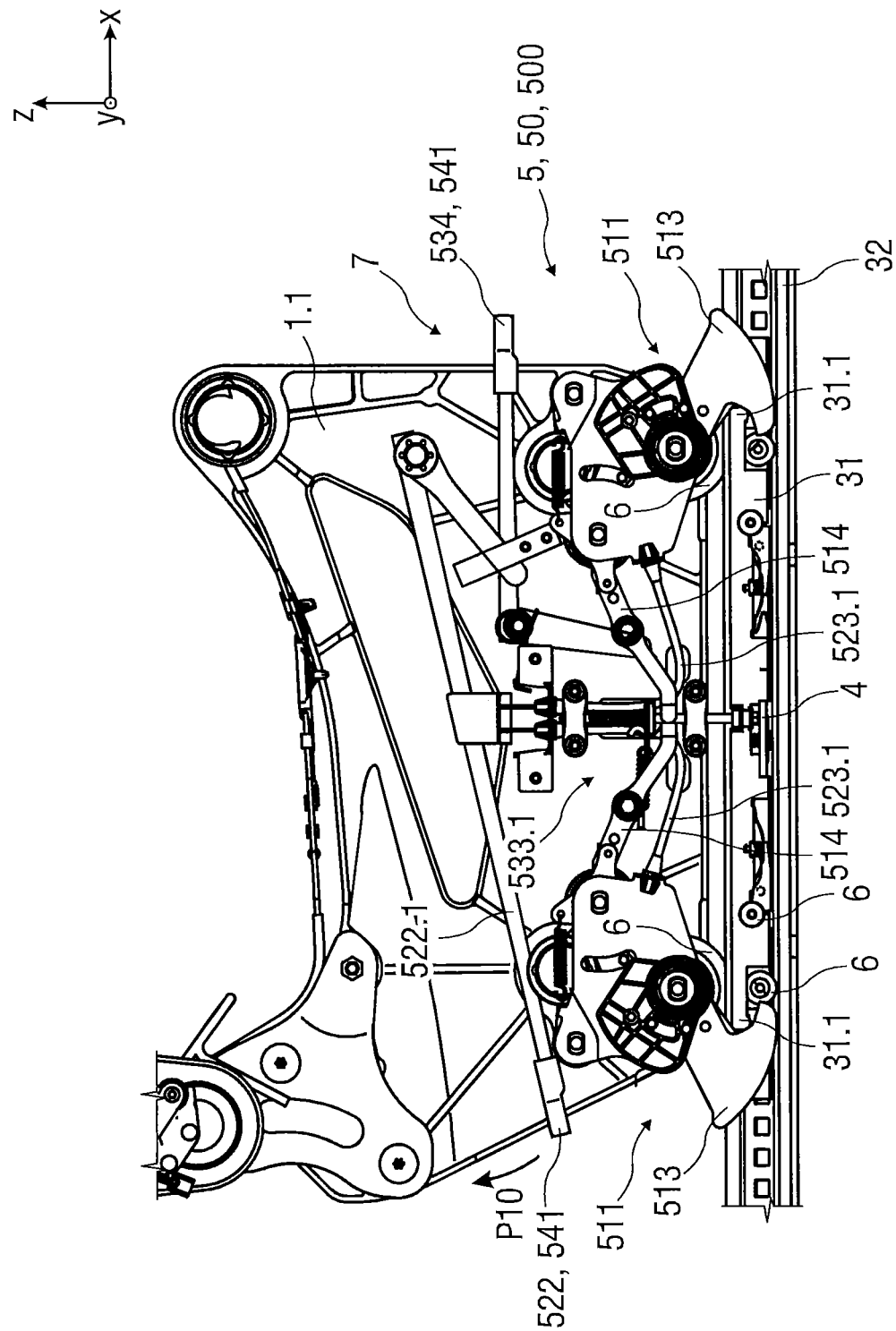
FIG. 18D shows a schematic side view of one embodiment of a portion of the seat in a movement sequence.
Figure 18E:
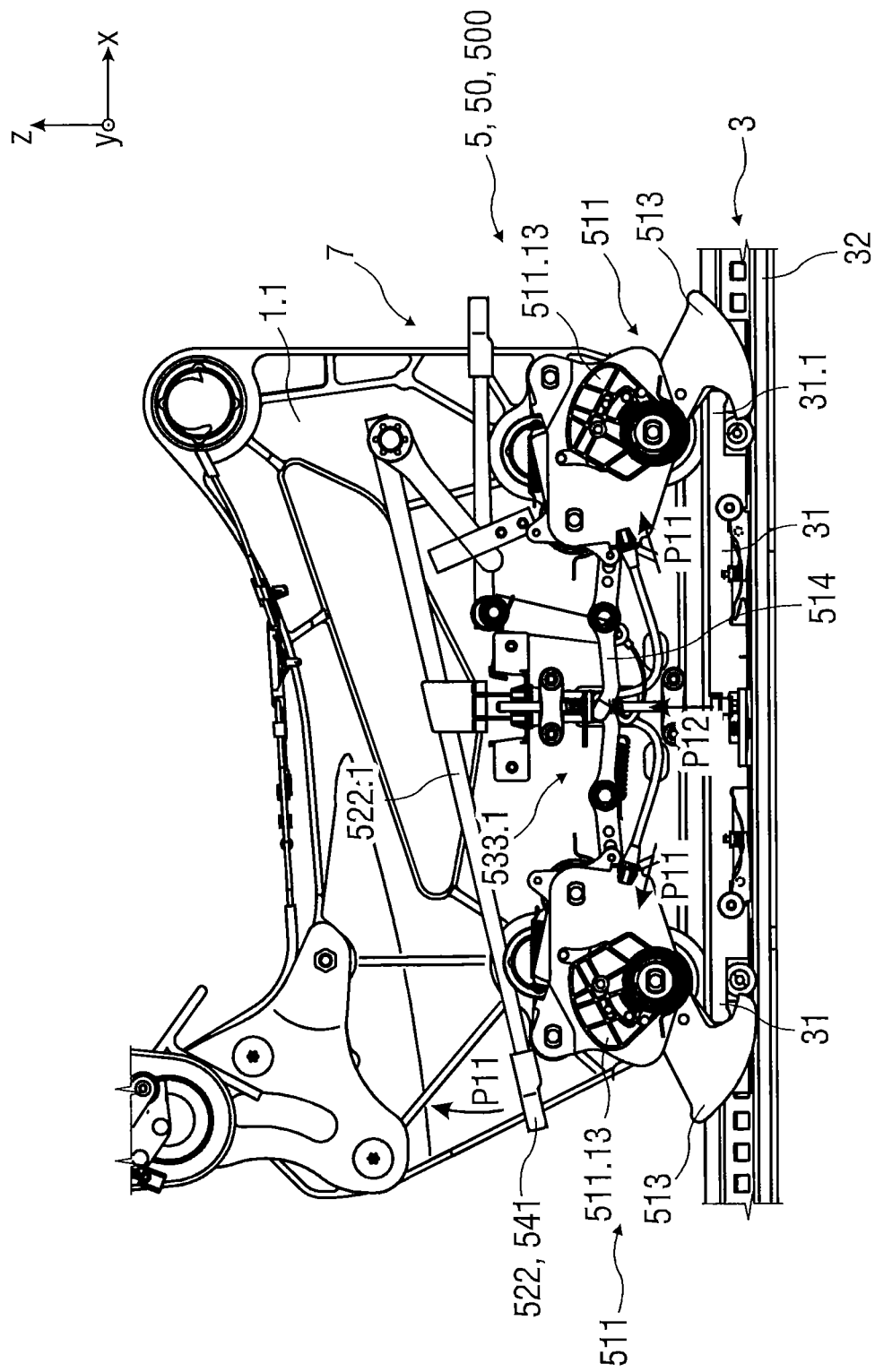
FIG. 18E shows a schematic side view of one embodiment of a portion of the seat in a movement sequence.

FIGS. 18D and 18E show an actuation of the lock actuating unit 522 in the upwards direction in accordance with arrow P10 firstly for unlocking the rails via the actuated unlocking units 514, in particular unlocking levers. The unlocking units 514, in particular unlocking levers, are connected via cable pulls 523.1, in particular via Bowden cables, to the locking element/locking elements 4, in particular locking plates, and lift them in accordance with arrows P11 and P12. In the process, the triggering plates 511.13 of the lock units 511 are rotated and lift the control elements 511.2 and, with the latter, the blocking elements 513, upwards until the blocking elements 513 are released from the locking region on the upper rail 31 and are therefore unlocked. In parallel therewith, the locking of the rails is released by the locking element 4 being moved, in particular lifted, into a release position and out of the upper rail 31 and the lower rail 32.

Figure 18F:
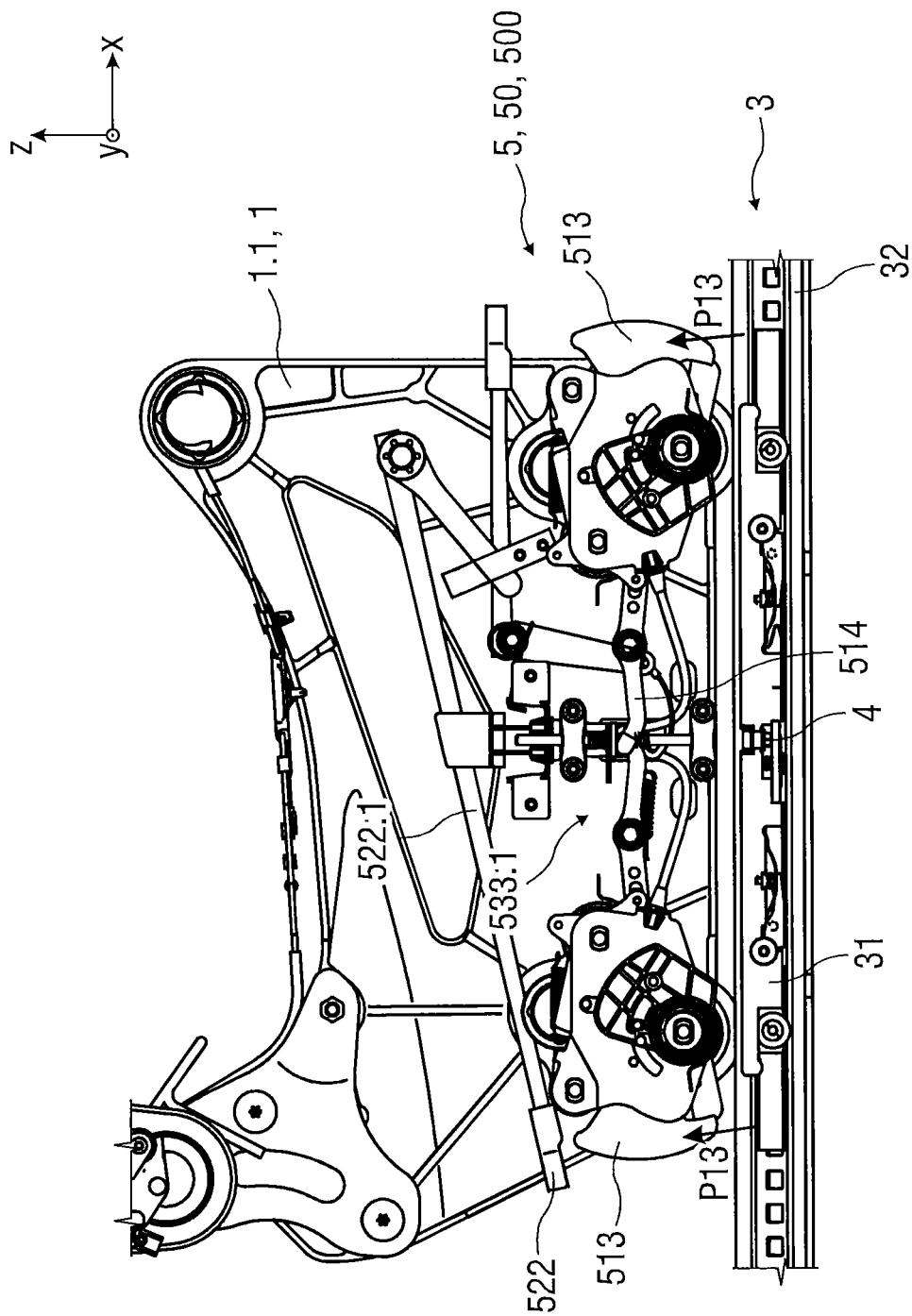
FIG. 18F shows a schematic side view of one embodiment of a portion of the seat in a movement sequence.

FIG. 18F shows the further actuation of the lock actuating unit 522 into a further raised position, wherein the triggering plates 511.13 are rotated further and the control elements 511.2 and the blocking elements 513 are raised further until the blocking elements 513 are arranged above the respective pair of rails 3 in accordance with arrow P13. In this release position or unlocking position of the fastening arrangement 5, 50, 500 or 5000, the lock actuating unit 522 is held secured in the associated raised position by the third spring element 511.14 (also called softlock spring). The seat 1 can now be rolled on the rail arrangement 2 or removed from the latter.

Figure 19B:
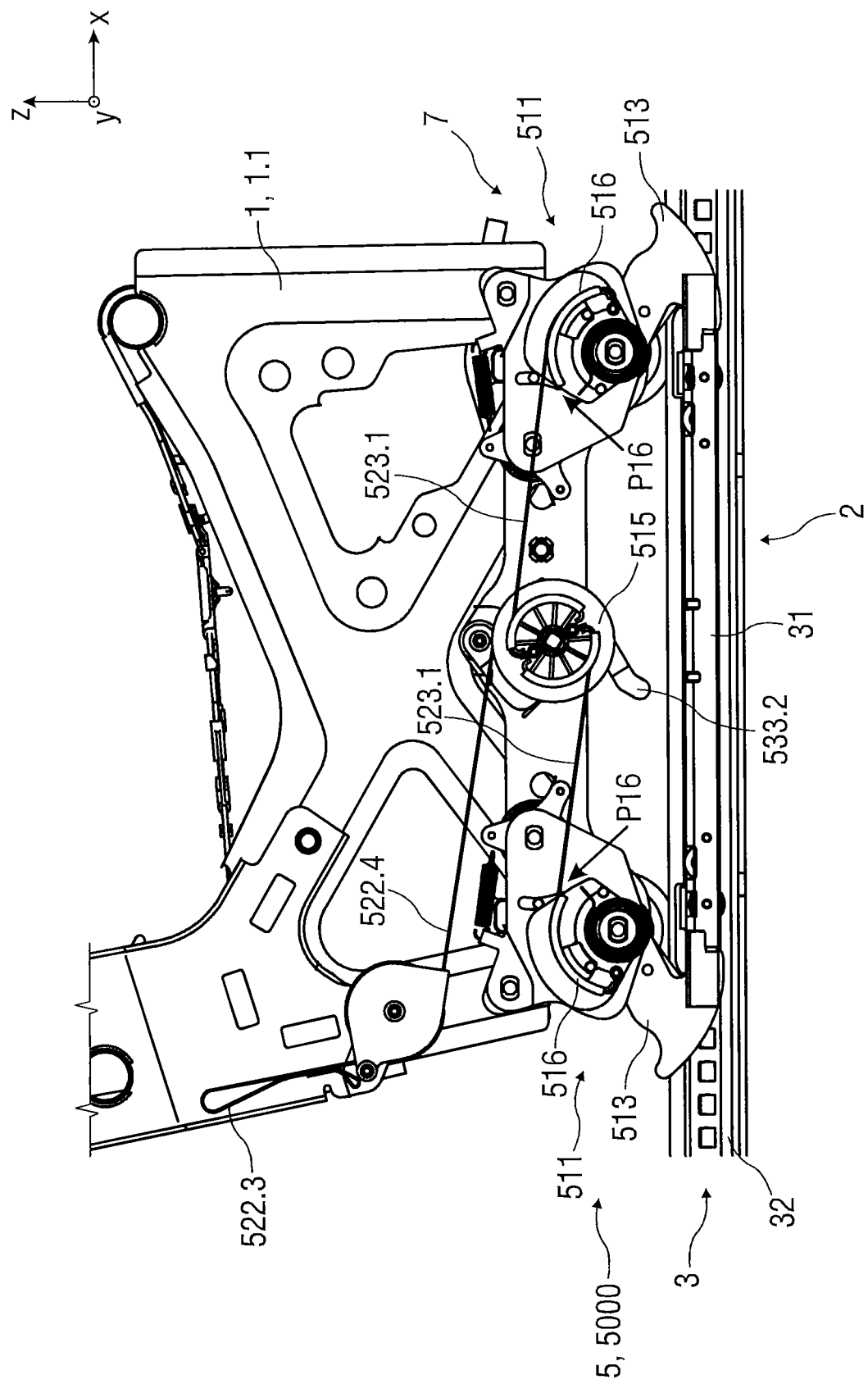
FIG. 19B shows a schematic side view of one embodiment of the cable mechanism in a movement sequence.
Figure 19C:
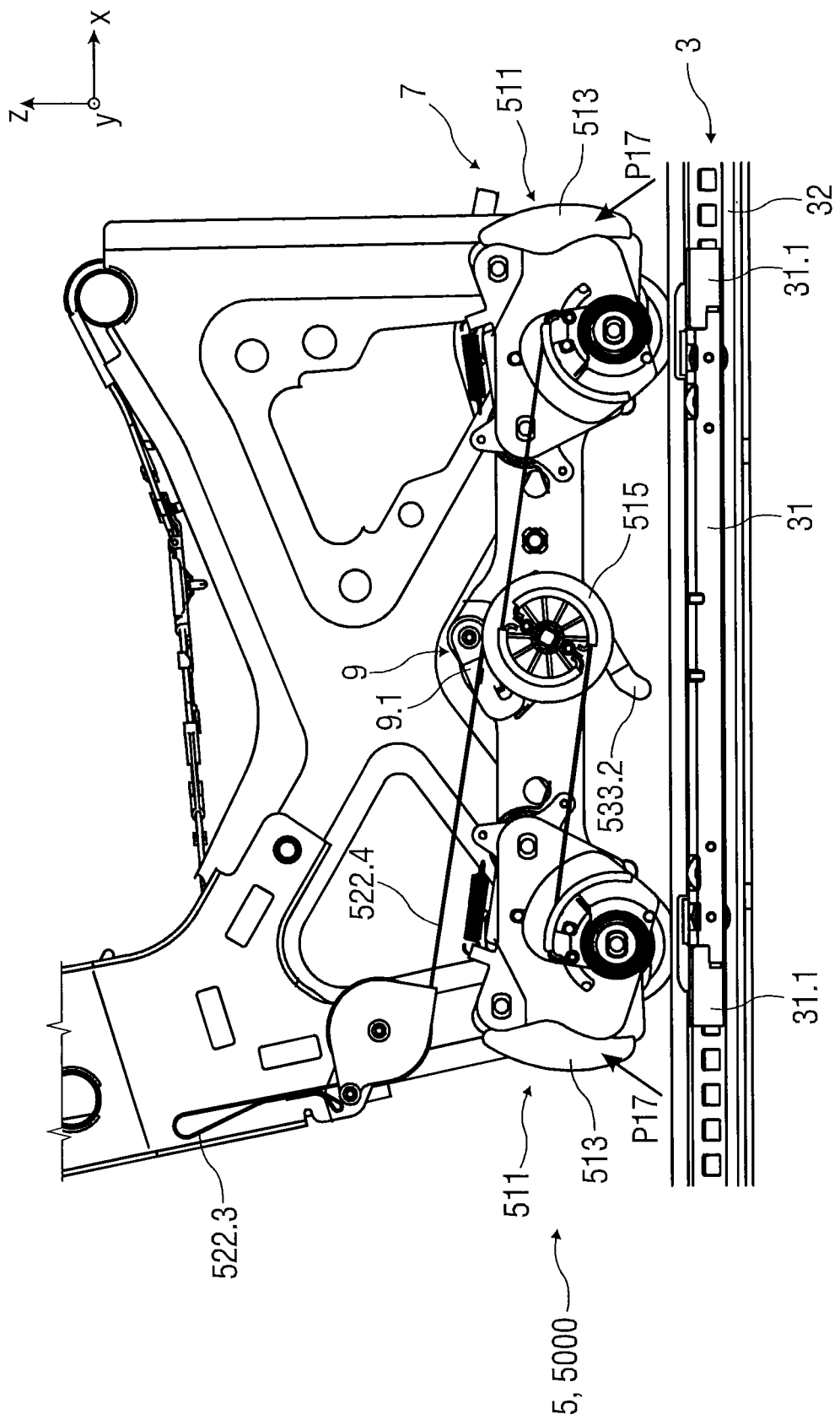
FIG. 19C shows a schematic side view of one embodiment of the cable mechanism in a movement sequence.

FIGS. 19A to 19C show a cable mechanism as actuating module 54.

FIG. 19A shows an actuation of the lock actuating cable 522.4 upwards in accordance with arrow P14. The deflecting pulley 515 (also called central pulley) is thereby moved in the anticlockwise direction, in particular rotated in accordance with arrow P15.

FIG. 19B shows that, as a result of the rotational movement of the deflecting pulley 515, the cable pulls 523.1 and 523.2 are actuated and raise a cam disc 516, in particular pivot the latter upwards, in accordance with arrow P16.

FIG. 19C shows that, upon further rotation of the deflecting pulley 515, the blocking elements 513 and the control elements 511.2 are raised in accordance with arrow P17. In order to hold the fastening arrangement 5 or 5000 in this release position or unlocked position, said fastening arrangement comprises a cable arresting means 9 (also called pull-pull lock) which arrests the cable pulls 523.1 and the lock actuating cable 522.4. The cable arresting means 9 is designed as a rotatable arresting hook or blocking lug 9.1.

FIGS. 20A to 20F show the sequence of movement of the cable arresting means 9.

Figure 20A:
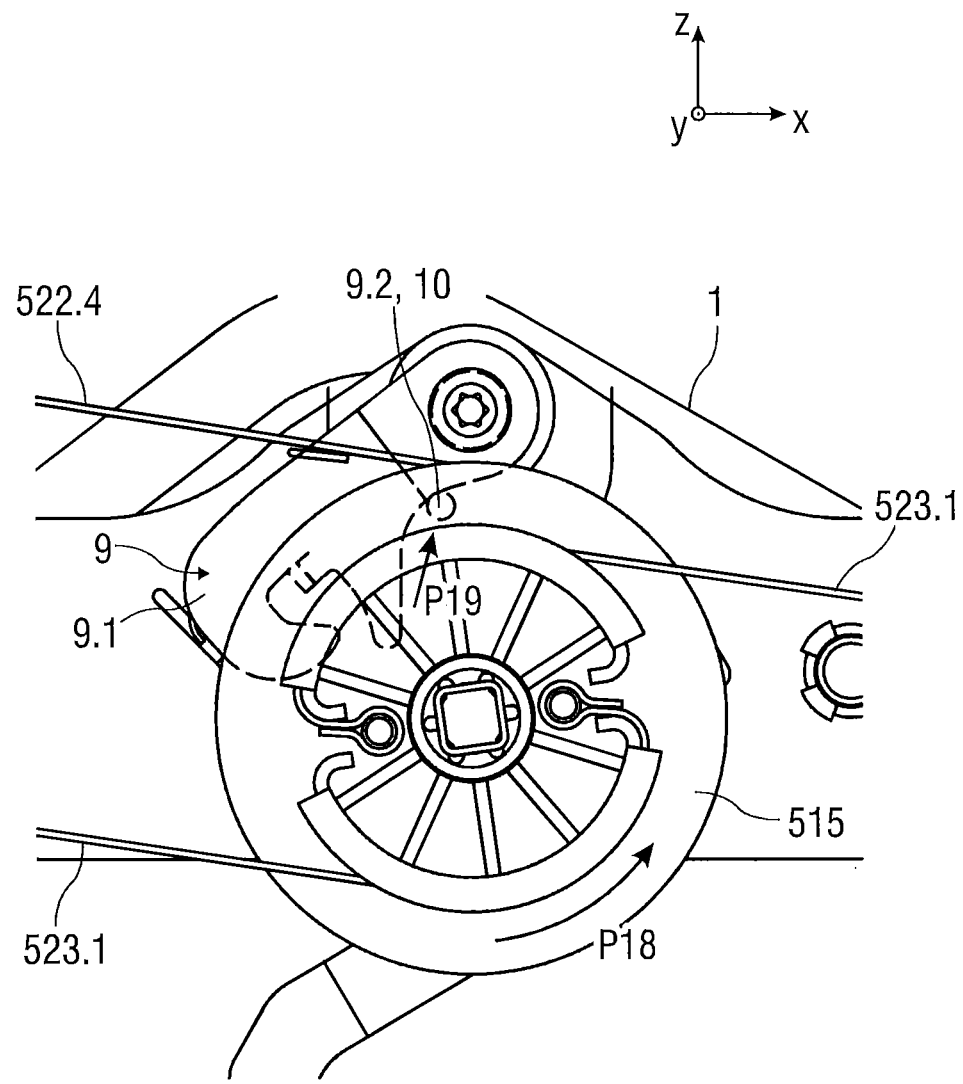
FIG. 20A shows a schematic side view of one embodiment of a cable arresting means in a movement sequence.

FIG. 20A shows the deflecting pulley 515 which rotates during the unlocking operation in accordance with arrow P18 and, in the process, entrains the cable arresting means 9, in accordance with arrow P19, by an entraining pin 10, which also serves as arresting pin 9.2.

Figure 20B:
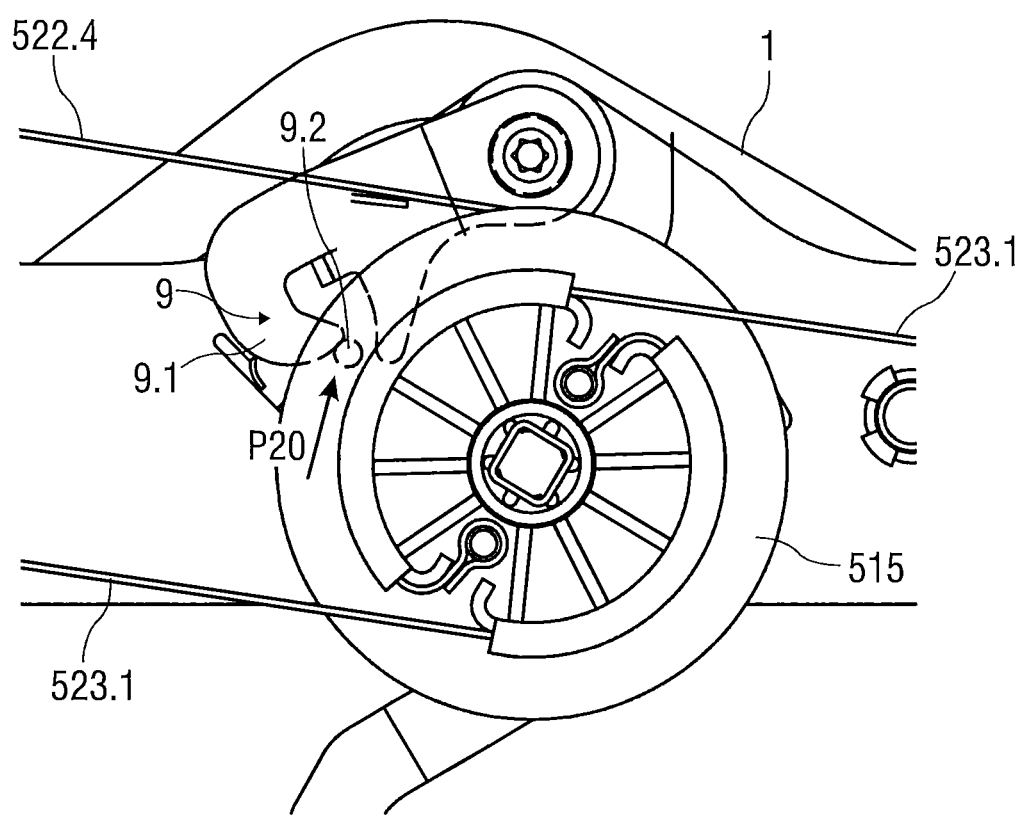
FIG. 20B shows a schematic side view of one embodiment of the cable arresting means in a movement sequence.

FIG. 20B shows the cable arresting means 9 in the arresting position in which it arrests the cable pulls 523.1 and the lock actuating cable 522.4 and the fastening arrangement 5, 5000 and therefore the blocking elements 513 are placed in the fully released position (release position). The cable arresting means 9 springs back until its blocking lug 9.1 strikes against an arresting pin 9.2, in accordance with arrow P20.

Figure 20C:
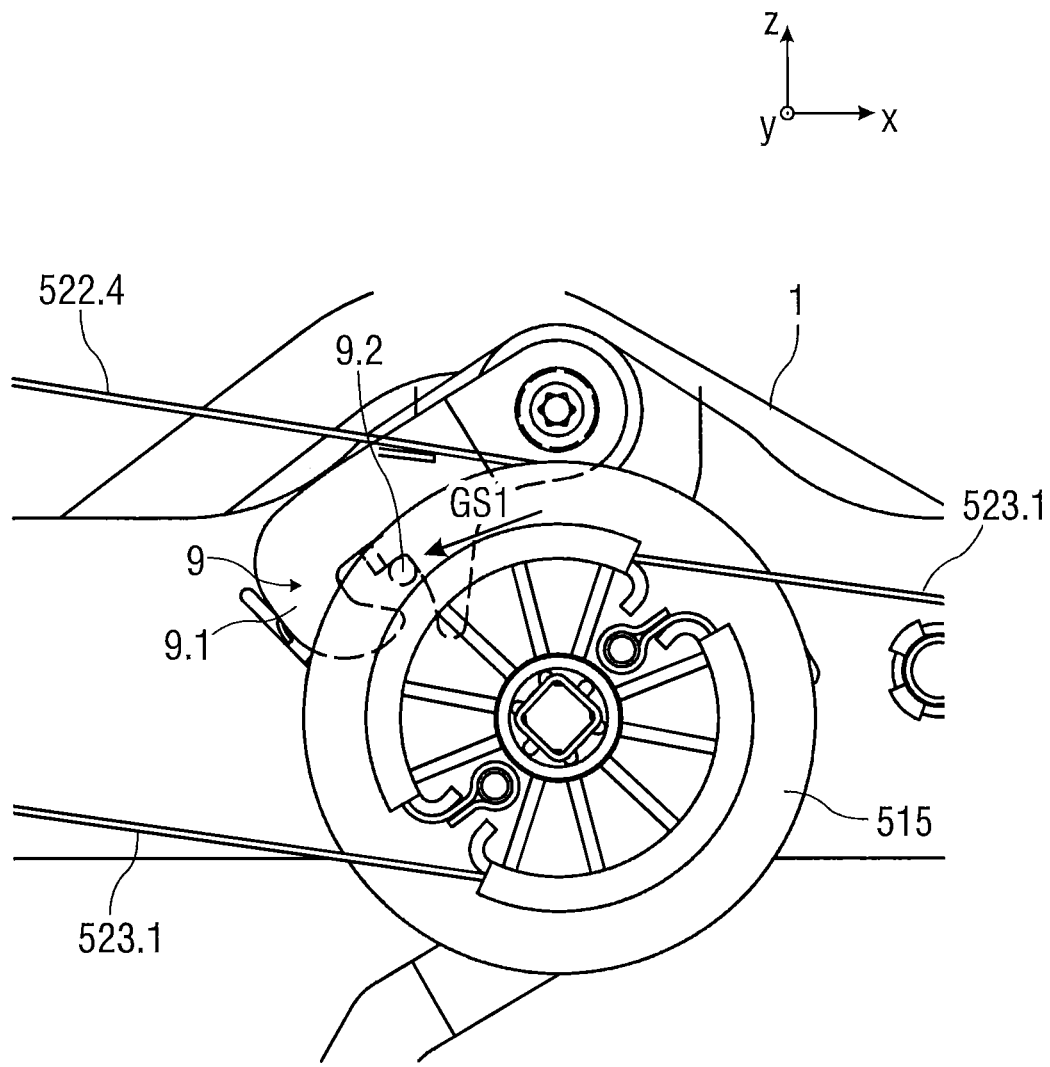
FIG. 20C shows a schematic side view of one embodiment of the cable arresting means in a movement sequence.

FIG. 20C shows the cable arresting means 9 in a first secured position GS1 when the lock actuating cable 522.4 is released again. The seat 1 can be moved, in particular rolled along the upper rail 31, or can be removed from the rail arrangement 2.

Figure 20D:
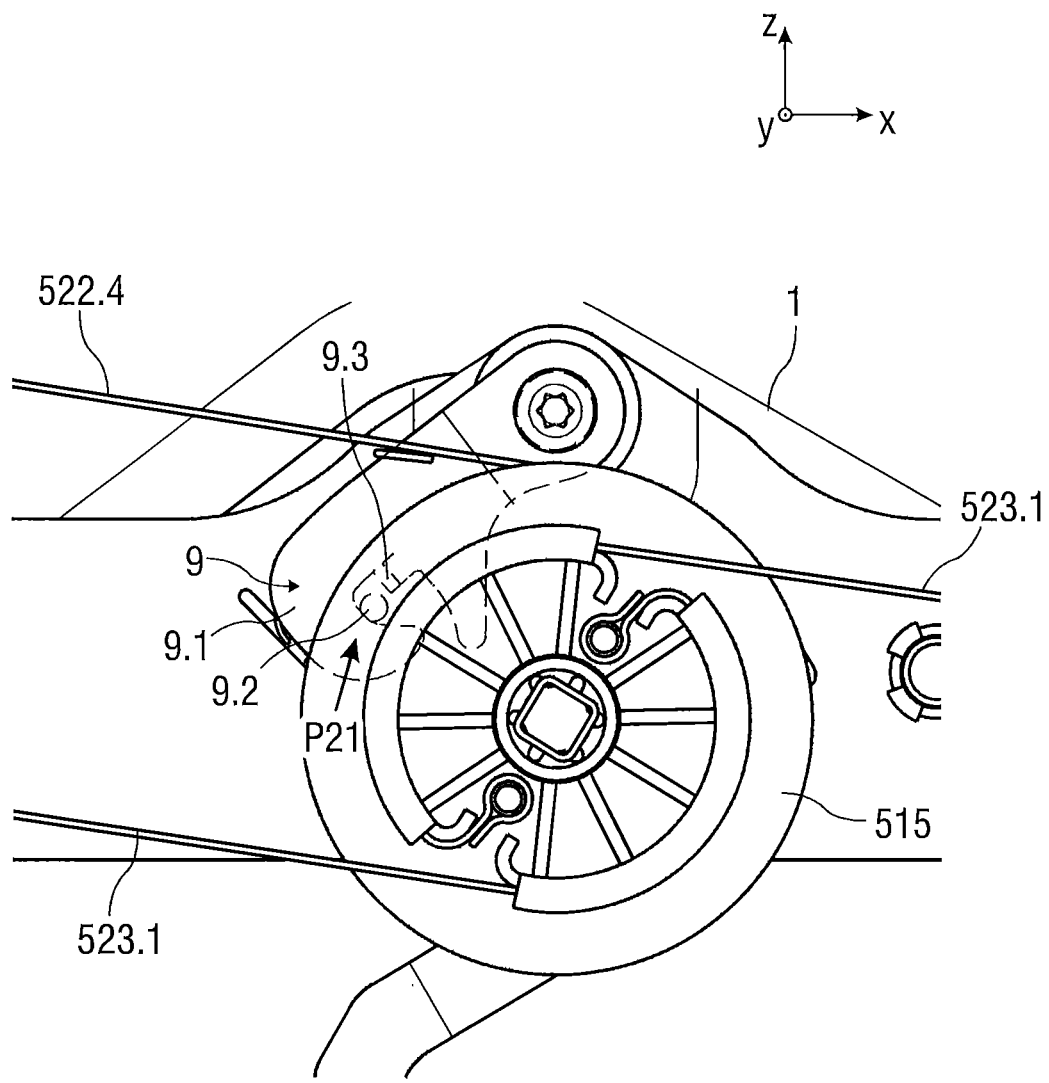
FIG. 20D shows a schematic side view of one embodiment of the cable arresting means in a movement sequence.

FIG. 20D shows the cable arresting means 9 in a second secured position GS2 in accordance with arrow P21, into which it is brought when the lock actuating cable 522.4 is actuated a further time. For this purpose, the blocking lug 9.1 has a blocking contour 9.3 which has correspondingly shaped blocking receptacles for the first and second secured position GS1, GS2 for the arresting pin 9.2.

Figure 20E:
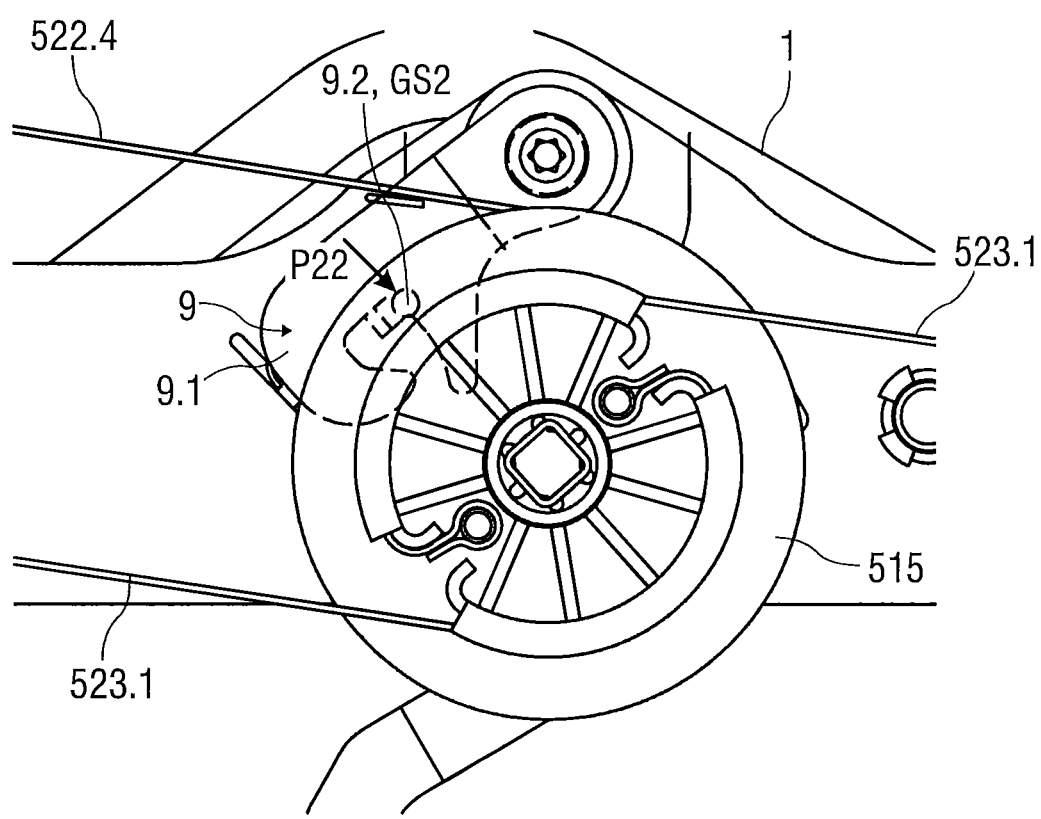
FIG. 20E shows a schematic side view of one embodiment of the cable arresting means in a movement sequence.

FIG. 20E shows the cable arresting means 9 when the lock actuating cable 522.4 is released. In the process, the arresting pin 9.2 moves in the Y axis direction and below the cable arresting means 9 along the surface side thereof, in accordance with arrow P22.

Figure 20F:
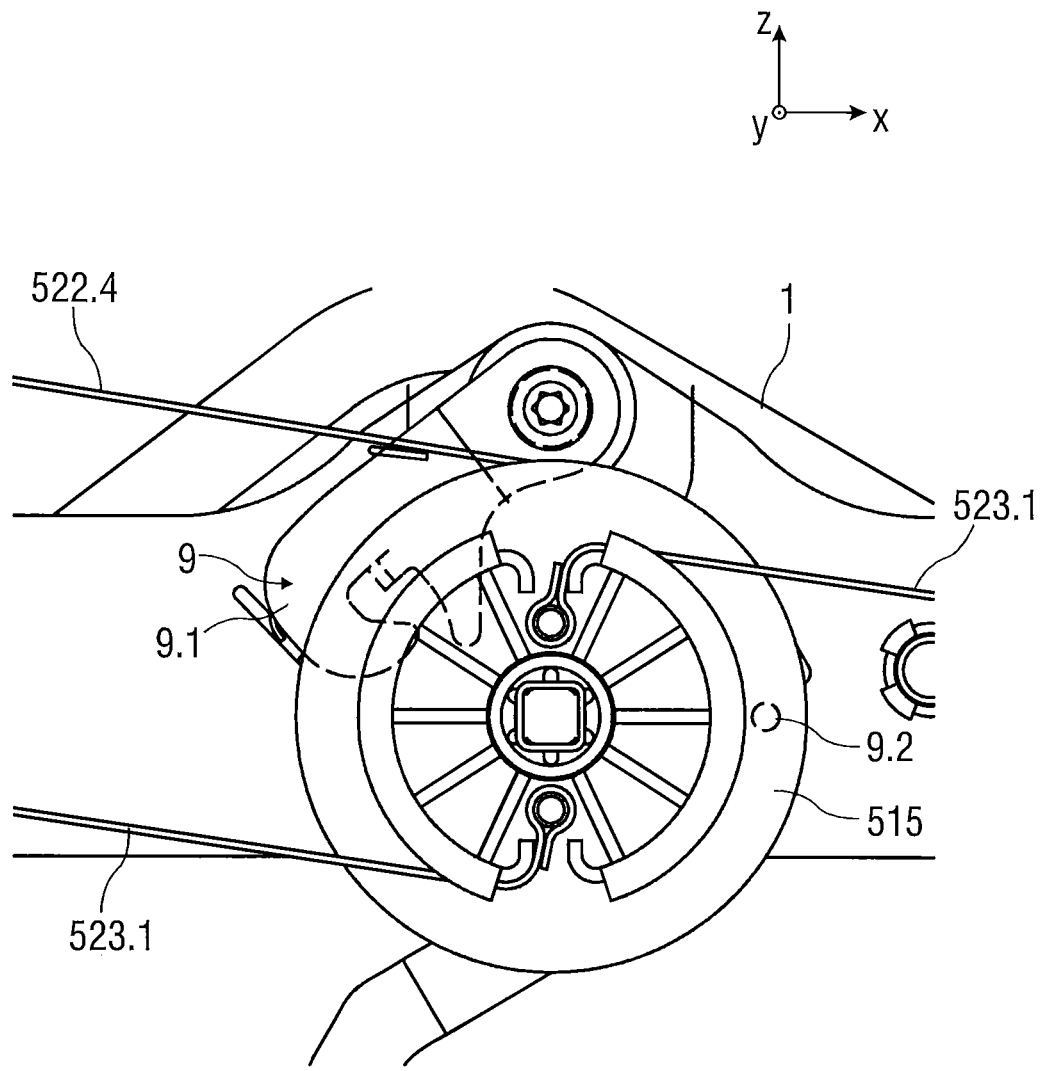
FIG. 20F shows a schematic side view of one embodiment of the cable arresting means in a movement sequence.

FIG. 20F shows the automatic, in particular spring-supported, restoring of the lock actuating cable 522.4 and of the deflecting pulley 515 into their starting position or locking position, in which the blocking elements 513 move downwards and therefore drop into the rail arrangement 2 when the seat 1 is arranged together with the associated fastening arrangement 5, 50, 500 or 5000. The cable arresting means 9 is released in the process. The arresting pin 9.2 is disengaged.

LIST OF REFERENCE DESIGNATIONS

1. Seat
1.1 Seat carrier

2 Rail arrangement
3 Pair of rails
31 Upper rail
31.1 Hook receptacle
32 Lower rail
33 Rail end
4 Locking element
5 Fastening arrangement
51 Lock module
511 Lock unit
511.1 First spring element
511.2 Control element
511.3 Second spring element
511.4 Compensating spring
511.5 Blocking hook holder
511.6 Holding pin
511.7 Coupling pin
511.8 Guide pin
511.9 Compensating element
511.10 Crash cam element
511.11 Reinforcing element
511.12 Carrier plate
511.13 Triggering plate
511.14 Third spring element
511.15 Bearing bushing
511.16 Entraining pin
511.17 Receptacle
511.18 Axis of rotation
511.19 Guide slot
511.20 Point of articulation
511.21 Guide slot
512 Integrated carrier element
513 Blocking element
514 Unlocking unit
514.1 Lever arm
515 Deflecting pulley
516 Cam disc
517 Blocking hook
52 Lock unlocking module
521 First carrier
522 Lock actuating unit
522.1, 522.2 Lever arm
522.3 Gripping element
522.4 Lock actuating cable
523 Lock unlocking mechanism
523.1, 523.2 Cable pull
524 Winding unit
523 Rail unlocking module
531 Second carrier
531.1 Lever arm
532 Rail actuating unit
533 Rail unlocking mechanism
533.1 Rail unlocking unit
533.2 Rail unlocking arm
533.3 Pin
534 Gripping unit
54 Actuating module
541 Actuating unit
50 First modular fastening arrangement
50.1 Frame
50.2 Lock adapter
50.3 Fastening element
500 Second modular fastening arrangement
5000 Third modular fastening arrangement
6 Rolling element
7 Docking mechanism
8, 80 Unlocking mechanism
9 Cable arresting means
9.1 Blocking lug
9.2 Arresting pin
9.3 Blocking contour
10 Entraining pin
GS1 First secured position
GS2 Second secured position
K Circle
P1 to P22 Arrow
X Longitudinal direction
Y Transverse direction
Z Vertical direction

The invention claimed is:

1. A fastening arrangement of a seat on a rail arrangement, wherein the fastening arrangement is of modular construction and comprises:
  one lock module for releasably arresting the fastening arrangement on the rail arrangement,
  wherein the lock module is of multi-part design and comprises at least two lock units,
  wherein each of the lock units are releasably fixed to both the seat and the rail arrangement, and
  one unlocking module for unlocking the lock module,
  wherein at least two rolling elements are rotatably mounted to the lock module so that the fastening arrangement is rolled away on the rail arrangement when the lock module is unlocked.

2. The fastening arrangement according to claim 1, wherein the lock units are arranged on a frame or on a carrier plate.

3. The fastening arrangement according to claim 1, wherein the unlocking module is configured to unlock the lock units synchronously from the rail arrangement.

4. The fastening arrangement according to claim 1, wherein an actuating module actuates the unlocking module of the fastening arrangement and/or a rail unlocking module.

5. The fastening arrangement according to claim 4, wherein the actuating module is coupled to the lock module via the unlocking module.

6. The fastening arrangement according to claim 4, wherein the actuating module is coupled to a locking element for the rail arrangement via the unlocking module.

7. A seat with a rail arrangement and a fastening arrangement according to claim 1 for releasably fastening the seat on the rail arrangement.

8. The seat according to claim 7, wherein the fastening arrangement is designed as a preassemble docking mechanism.

9. The seat according to claim 7 wherein the rail arrangement comprises two pairs of rails each having an upper rail and a lower rail, and the fastening arrangement is releasably arrestable at one rail end of the upper rail by a respective lock unit.

* * * * *